(12) United States Patent
Narayan et al.

(10) Patent No.: US 11,568,373 B2
(45) Date of Patent: Jan. 31, 2023

(54) AUTOMATED SUPPORT FOR FREELANCERS

(71) Applicant: Giga Technologies, San Ramon, CA (US)

(72) Inventors: Prasanna L. Narayan, San Ramon, CA (US); Amarinder Bansal, Fremont, CA (US)

(73) Assignee: Giga Technologies, San Ramon, CA (US)

( * ) Notice: Subject to any disclaimer, the term of this patent is extended or adjusted under 35 U.S.C. 154(b) by 0 days.

(21) Appl. No.: 17/363,577

(22) Filed: Jun. 30, 2021

(65) Prior Publication Data

US 2022/0391863 A1 Dec. 8, 2022

Related U.S. Application Data

(60) Provisional application No. 63/197,246, filed on Jun. 4, 2021.

(51) Int. Cl.
| | | |
|---|---|---|
| *G06Q 20/08* | (2012.01) | |
| *G06Q 20/38* | (2012.01) | |
| *G06Q 40/02* | (2012.01) | |
| *G06Q 20/32* | (2012.01) | |
| *G06Q 20/10* | (2012.01) | |
| *G06F 40/42* | (2020.01) | |
| *G06Q 30/04* | (2012.01) | |
| *G06Q 30/00* | (2012.01) | |
| *G06F 9/54* | (2006.01) | |
| *G06Q 20/02* | (2012.01) | |

(52) U.S. Cl.
CPC ........... *G06Q 20/085* (2013.01); *G06F 9/541* (2013.01); *G06F 40/42* (2020.01); *G06Q 20/02* (2013.01); *G06Q 20/108* (2013.01); *G06Q 20/3223* (2013.01); *G06Q 20/3255* (2013.01); *G06Q 20/3821* (2013.01); *G06Q 30/016* (2013.01); *G06Q 30/04* (2013.01); *G06Q 40/02* (2013.01)

(58) Field of Classification Search
USPC ..................................... 705/40, 35
See application file for complete search history.

(56) References Cited

U.S. PATENT DOCUMENTS

| | | | |
|---|---|---|---|
| 10,460,312 B1 | 10/2019 | Kurani et al. | |
| 2002/0095372 A1* | 7/2002 | Likourezos | G06Q 40/08 705/37 |

(Continued)

OTHER PUBLICATIONS

Mastercard and Lyft Partner to Provide Drivers Immediate Access to Their Earnings Business Wire [New York] May 15, 2019. (Year: 2019).*

(Continued)

*Primary Examiner* — William E Rankins
(74) *Attorney, Agent, or Firm* — Seed IP Law Group LLP

(57) ABSTRACT

A facility for facilitating payments from a client to a freelancer is described. The facility provides a mobile app enabling the freelancer to open an account and solicit payments by clients. In response, each client can use any of a variety of forms of electronic payments to pay into the account. The freelancer can use a debit card issued for the account to spend or withdraw payments made into the account, and can use the app to track requests for payment, payments, client activity, and spending and withdrawals from the account.

21 Claims, 33 Drawing Sheets

(56) References Cited

U.S. PATENT DOCUMENTS

| | | |
|---|---|---|
| 2008/0172311 A1 | 7/2008 | Curran |
| 2016/0117665 A1 | 4/2016 | Davis |
| 2017/0039547 A1* | 2/2017 | Bonsi .................... G06Q 20/20 |
| 2017/0132630 A1 | 5/2017 | Castinado et al. |
| 2018/0096351 A1 | 4/2018 | Dahn |
| 2019/0172065 A1* | 6/2019 | Hosny ................. G06Q 20/322 |
| 2019/0306128 A1* | 10/2019 | Kothavale .......... G06Q 20/3678 |
| 2020/0327543 A1* | 10/2020 | Singh ................... G06Q 20/027 |
| 2021/0049680 A1* | 2/2021 | Solis ................. G06Q 20/0655 |

OTHER PUBLICATIONS

International Search Report and Written Opinion, dated Nov. 30, 2022, for International Application No. PCT/US22/32258, 15 pages.

\* cited by examiner

US 11,568,373 B2

AUTOMATED SUPPORT FOR FREELANCERS

CROSS-REFERENCE TO RELATED APPLICATIONS

This application claims the benefit of provisional U.S. Application No. 63/197,246, filed Jun. 4, 2021 and entitled "AUTOMATED SUPPORT FOR FREELANCERS," which is hereby incorporated by reference in its entirety.

In cases where the present application conflicts with a document incorporated by reference, the present application controls.

BACKGROUND

People whose work involves independently doing projects, services, or tasks for a number of different clients are sometimes called "freelancers," or "gig workers." (For simplicity, they are referred to simply as "freelancers" herein.) The types of work freelancers perform are varied: home care, pet care, handyman, home improvement, babysitting, daycare, digital media creation, writing, photography, event planning, educational services such as tutoring, music instruction, coaching, and many more. It is common for clients to pay freelancers via cash or personal checks, in response to a verbal in-person or telephone request by the freelancer.

DETAILED DESCRIPTION

Figure 1:
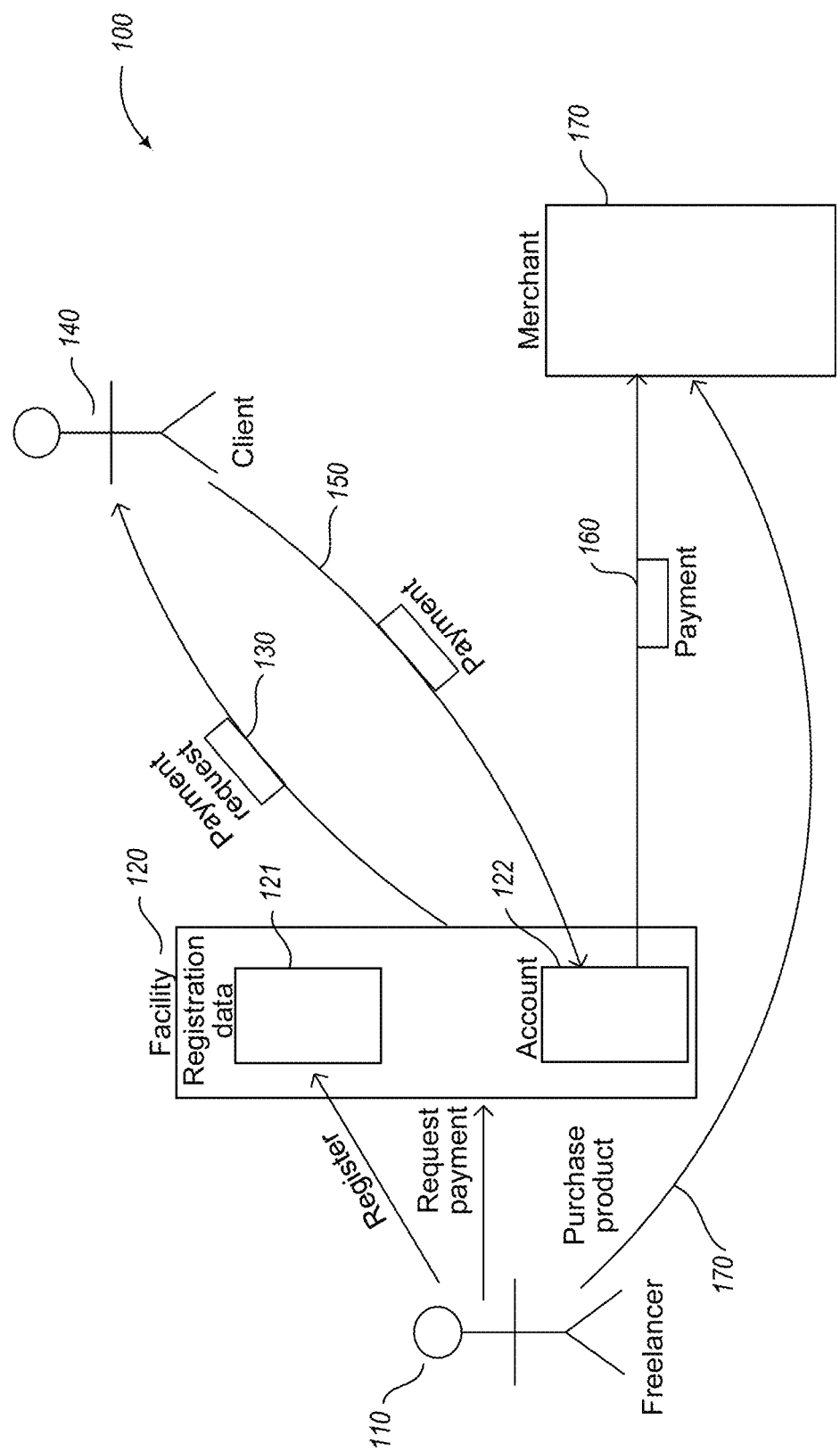
FIG. 1 is a data flow diagram showing an overview of the operation of the facility.

The inventors have recognized significant disadvantages of conventional approaches by which clients pay freelancers. First, cash and checkbooks are specific physical items that the client must access in order to use them in payment. To the extent that the client has one of these items, they may well be in a place that is difficult or impossible to access at the time when they are needed to pay the freelancer. As cash and personal checks continue to become less-frequently used, the likelihood that they will both be difficult for the client to access increases.

Also, the use of these forms of payment make less information available to clients than more modern electronic forms of payment, such as person-to-person digital payments, or payments using credit cards, debit cards, digital wallets, or mobile wallets. These more modern electronic forms of payment more accurately, automatically, and promptly capture the date and amount of the transaction, make this and payee type information easily available for account and budget reconciliation and spending-by-category reports, etc. Unfortunately, the financial and technological overhead of directly accepting credit and debit card payments puts this option out of reach for most freelancers.

Also, requesting payment in the conventional manners can require significant effort by the freelancer. Any such request must be manually coordinated by the client with the action they take to pay the freelancer.

Further, payments received by the freelancer in the conventional forms of check or cash cannot be easily spent with a remote merchant, and take effort and time to deposit in an account of the freelancer.

To overcome these disadvantages of conventional approaches to paying freelancers, the inventors have conceived and reduced to practice a software and/or hardware facility for electronically paying individual payees, such as freelancers, for their work ("the facility").

The facility includes a special-purpose app that can be installed on smartphones by freelancers and other individuals who wish to be paid. In some embodiments, the facility also or instead provides a web interface for delivering some or all of smartphone app functionalities described herein. These people are variously referred to as "freelancers" and "payees" herein. In some embodiments, as part of installing and activating the app, the facility creates a bank account for the payee to receive payment made to the payee by clients or other "payers". In some embodiments, the facility causes a debit card associated with this bank account to be issued to the payee. The payee can access the funds as early as the payment is authorized by the payer. The payee uses the debit card to access funds received into the account from payers, such as by physically using the debit card to withdraw funds at an ATM or bank branch, or to make in-person purchases at a merchant; or use information printed on the debit card to make remote purchases over the phone or from web merchants. The payee may also save funds in this account, protecting them from loss and in some cases earning interest or investing them.

A payee can use the app to generate a request for payment and send it to the payer, such as via email or SMS. The payee can configure the request, such as by identifying the amount to be paid, and the date and type of service performed; providing a photo showing performance or completion of the service; tailoring text in the request; specifying whether a tip should be solicited in the request; specifying whether any special offers for future services should be included in the request; and determining the mode of communication by which the request will be sent to the payer. In some embodiments, the app permits the payee to preview the request before it is sent.

The request for payment received by the payer includes all the information designated by the payee, as well as a link that the payer can follow in order to make payment. The payer can choose among a number of different forms of payment, including for example credit and debit cards, mobile operating system-specific payment services, operating system-agnostic payment services, installment loan underwriters, etc.

In some embodiments, the app provides an interface that permits the payee to track payments and outstanding payment requests, account balance, client histories and trends, spending from the account, and other related information.

By performing in some or all of the ways discussed above, the facility makes it easy for individual payees to solicit, receive, track, save, and/or immediately spend payments from payers, especially individual payers. The facility also makes it significantly more convenient for payers to pay payees.

Also, the facility improves the functioning of computer or other hardware, such as by reducing the dynamic display area, processing, storage, and/or data transmission resources needed to perform a certain task, thereby enabling the task to be performed by less capable, capacious, and/or expensive hardware devices, and/or be performed with less latency, and/or preserving more of the conserved resources for use in performing other tasks or additional instances of the same task. For example, relative to manual efforts by payers to seek, obtain, and track payments from payers that use a smartphone or other computing device, the facility saves processing resources that would be used to receive and perform individual commands from the payee to author and send manual payment request messages, manually maintain status information for each request, input information about cash and checks received, manually update metrics quantifying total payments from individual payees and all payees, etc.

FIG. 1 is a data flow diagram showing an overview of the operation of the facility. Diagram 100 shows a freelancer 110 who works for a client 140. First, the freelancer registers 111 with the facility 120, providing registration data 121 that is stored by the facility. As part of the registration, the facility creates an account 122 into which payments by clients of the freelancer will be deposited for spending and/or saving by the freelancer. After this point, the freelancer can request payment 112 using the facility. In response, the facility sends a payment request 130 to the client. The client can immediately respond by making a payment 150 using any of a wide variety of electronic payment methods. The facility causes this payment to be promptly deposited in the freelancer's account. At this point, the facility notifies the freelancer of the deposit, and the freelancer can use a debit card or digital wallet associated with the account to spend some or all of the amount of the payment received from the client as soon as the payment is authorized, well before the funds are actually received from a payment processor that processes the client's payment. For example, the freelancer can immediately purchase a product 113 from a merchant 170 using the debit card or electronic wallet associated with the account. A payment 160 is made from the account to the merchant, who provides the purchased product to the freelancer. In this way, the facility enables the freelancer to be paid by the client in a way that is convenient to both the freelancer and the client, and permits the freelancer to spend some or all of the payment promptly in response to its sending by the client.

Figure 2:
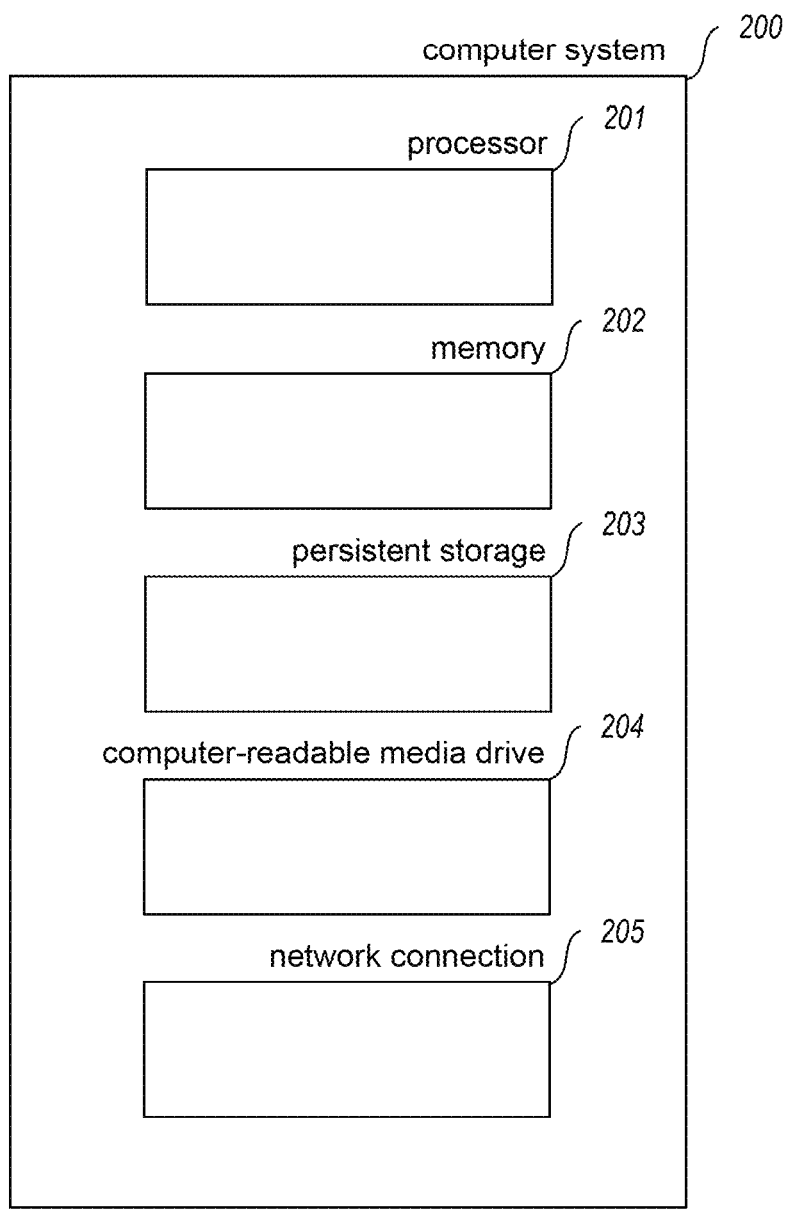
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

As used herein, a "non-transitory computer-readable memory" can be any element that can store the program associated with logic and/or information for use by or in connection with the instruction execution system, apparatus, and/or device. The computer-readable memory can be, for example, but is not limited to, an electronic, magnetic, optical, electromagnetic, infrared, or semiconductor system, apparatus or device. More specific examples (a non-exhaustive list) of the computer-readable memory would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media and mediums. As used herein, a "non-transitory computer-readable memory" does not include transitory elements such as data signals and carrier waves.

Figure 3:
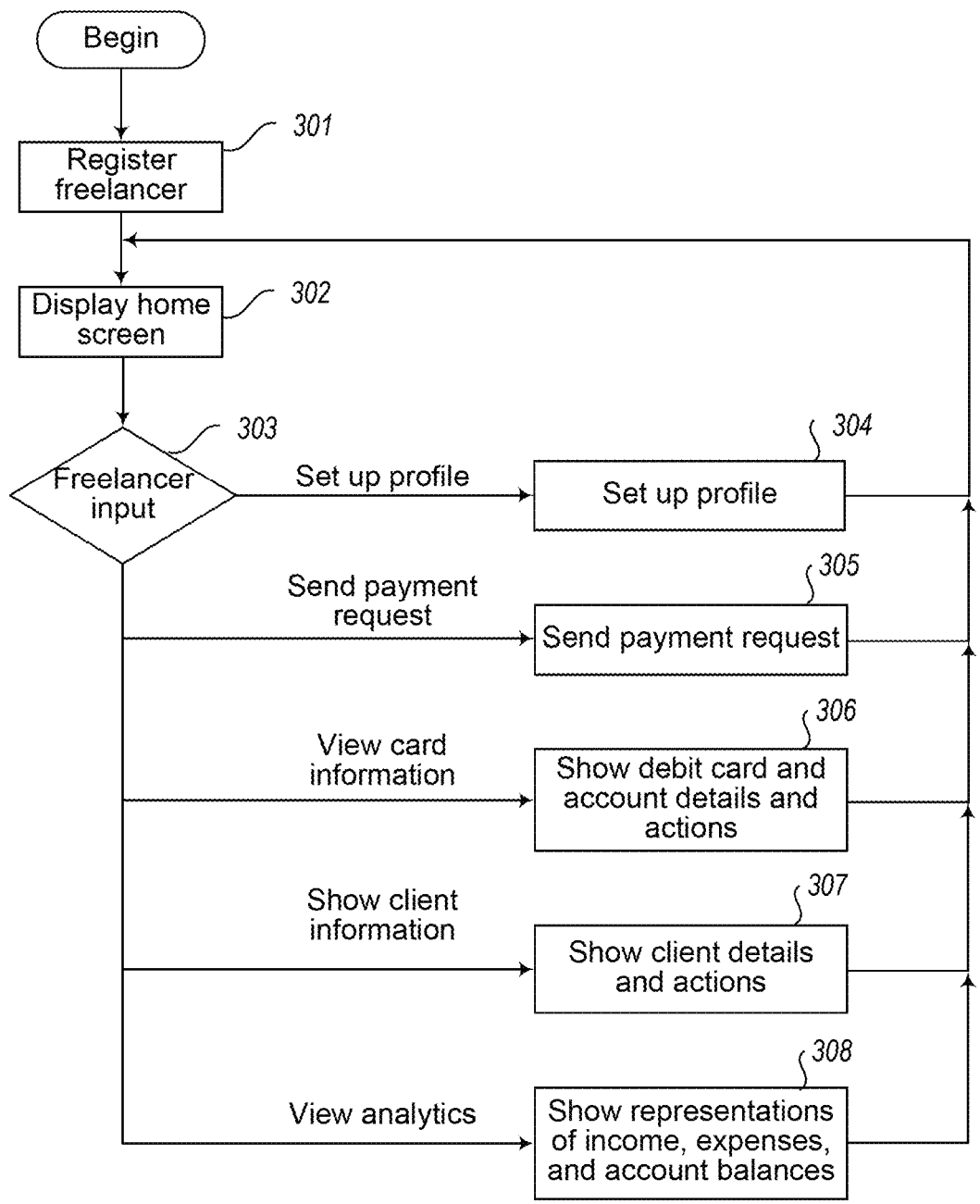
FIG. 3 is a flow diagram showing a process performed by the facility in some embodiments to support a freelancer in receiving payments form clients.

FIG. 3 is a flow diagram showing a process performed by the facility in some embodiments to support a freelancer in receiving payments form clients. In act 301, the facility registers the freelancer. The facility's performance of act 301 is discussed further below in connection with FIG. 4.

Figure 4:
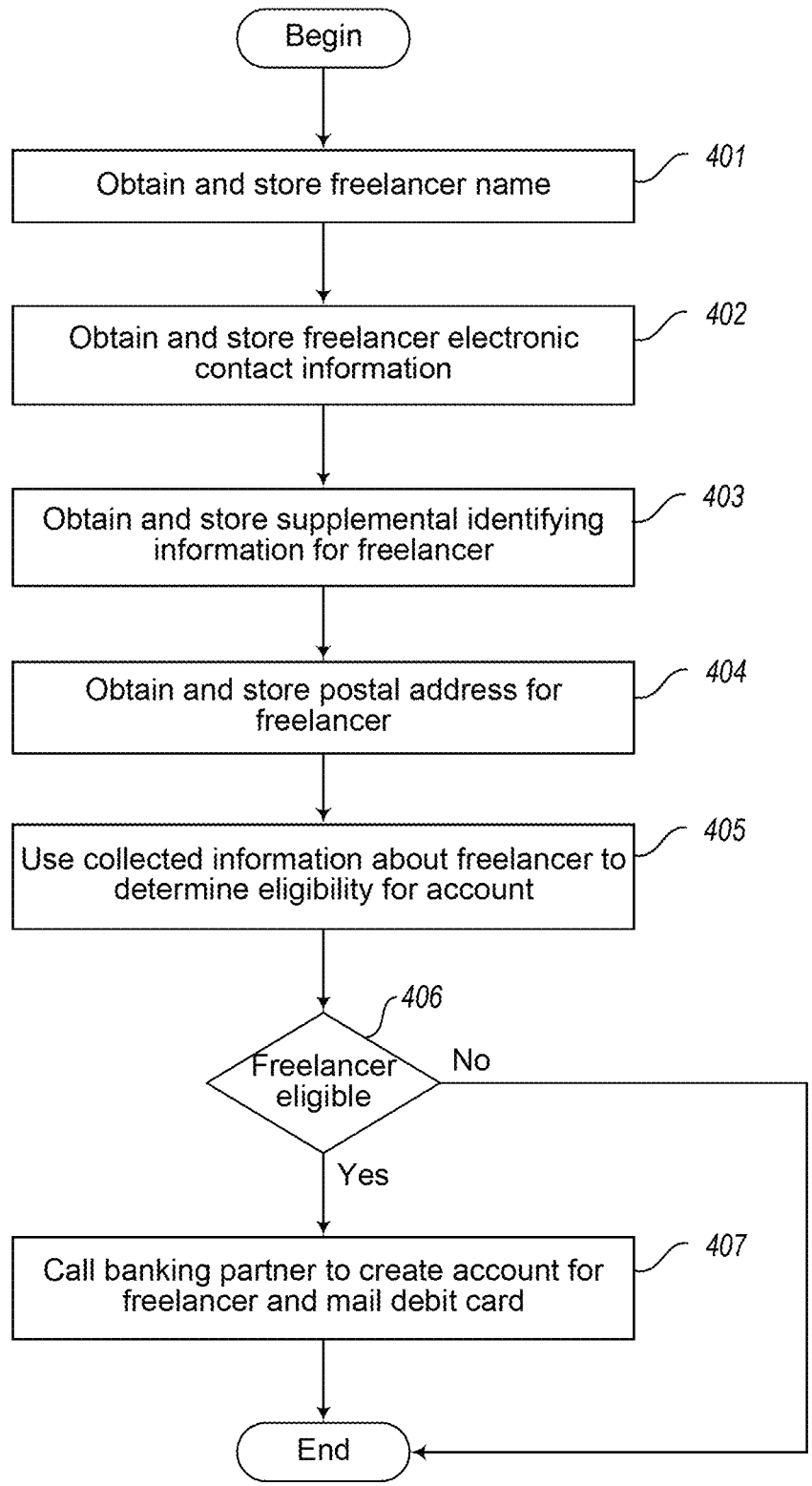
FIG. 4 is a flow diagram showing a process performed by the facility in some embodiments to register a freelancer.

FIG. 4 is a flow diagram showing a process performed by the facility in some embodiments to register a freelancer. In some embodiments, the facility performs this process, as well as those discussed in FIGS. 3, 10, and 16—in a mobile app installed by the freelancer on a mobile device such as a smartphone or tablet. In various embodiments, the freelancer installs the mobile app from a phone manufacturer app store, a third-party app store, a website provided by the operator of the facility or a third party, etc.

In act 401, the facility obtains and stores the name of the freelancer. In act 402, the facility obtains and stores electronic contact information for the freelancer. The facility's performance of acts 401 and 402 is discussed below in connection with FIG. 5.

Figure 5:
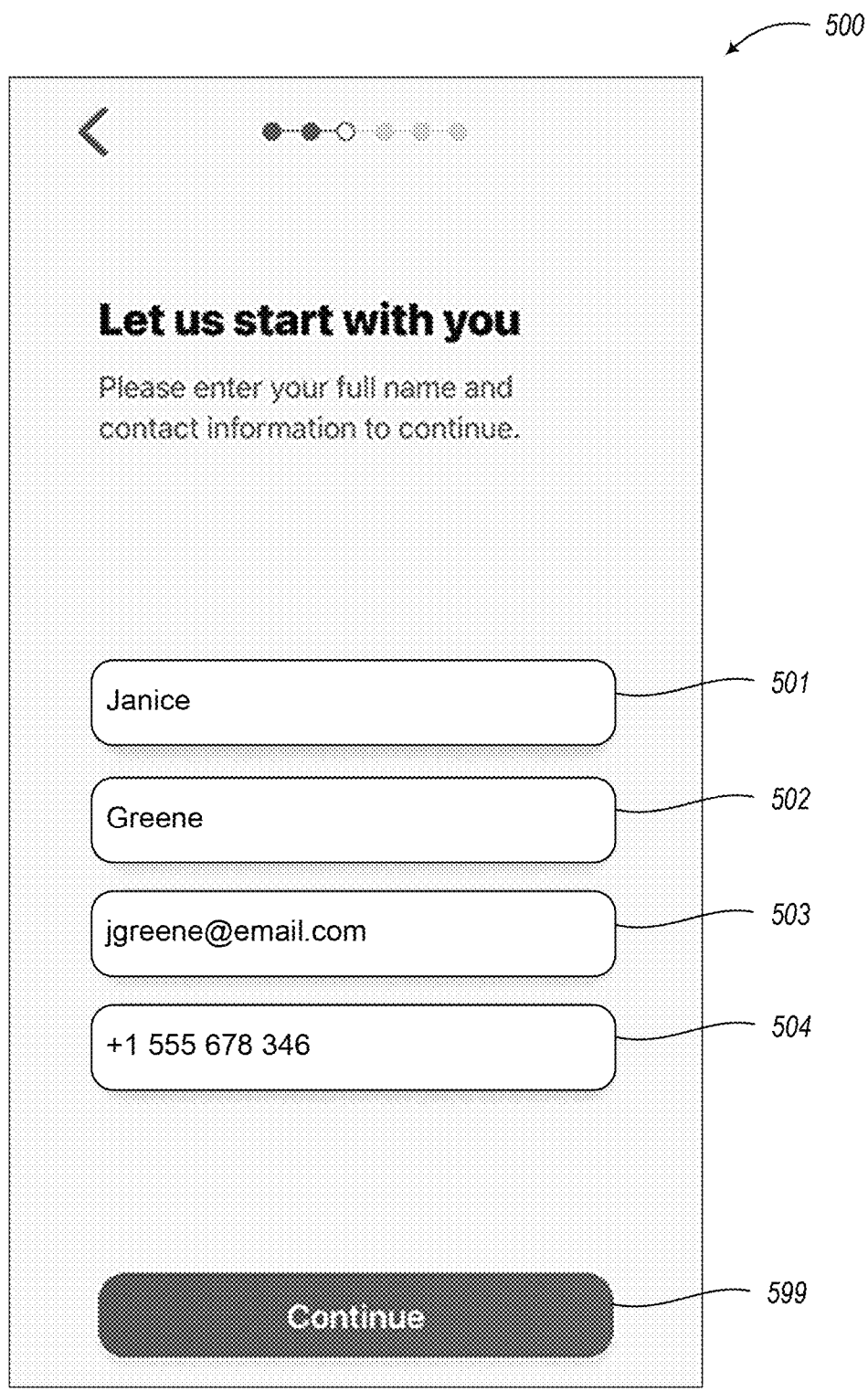
FIG. 5 is a display diagram showing a sample display presented by the facility in some embodiments in order to obtain freelancer information during registration.

FIG. 5 is a display diagram showing a sample display presented by the facility in some embodiments in order to obtain freelancer information during registration. The display 500 includes field 501 in which the freelancer can enter their first name; field 502 in which the freelancer can enter their last name; field 503 in which the freelancer can enter their email address; and field 504 in which the freelancer can enter their mobile phone number. After populating these fields, the freelancer can activate continue control 599 in order to submit the entered information and proceed.

While FIG. 5 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

Returning to FIG. 4, in act 403, the facility obtains and stores supplemental identifying information for the freelancer used by the facility in some embodiments to verify the freelancer's identity and/or the freelancer's eligibility for a freelancer account provided by the facility. The facility's performance of act 403 is discussed further below in connection with FIG. 6.

Figure 6:
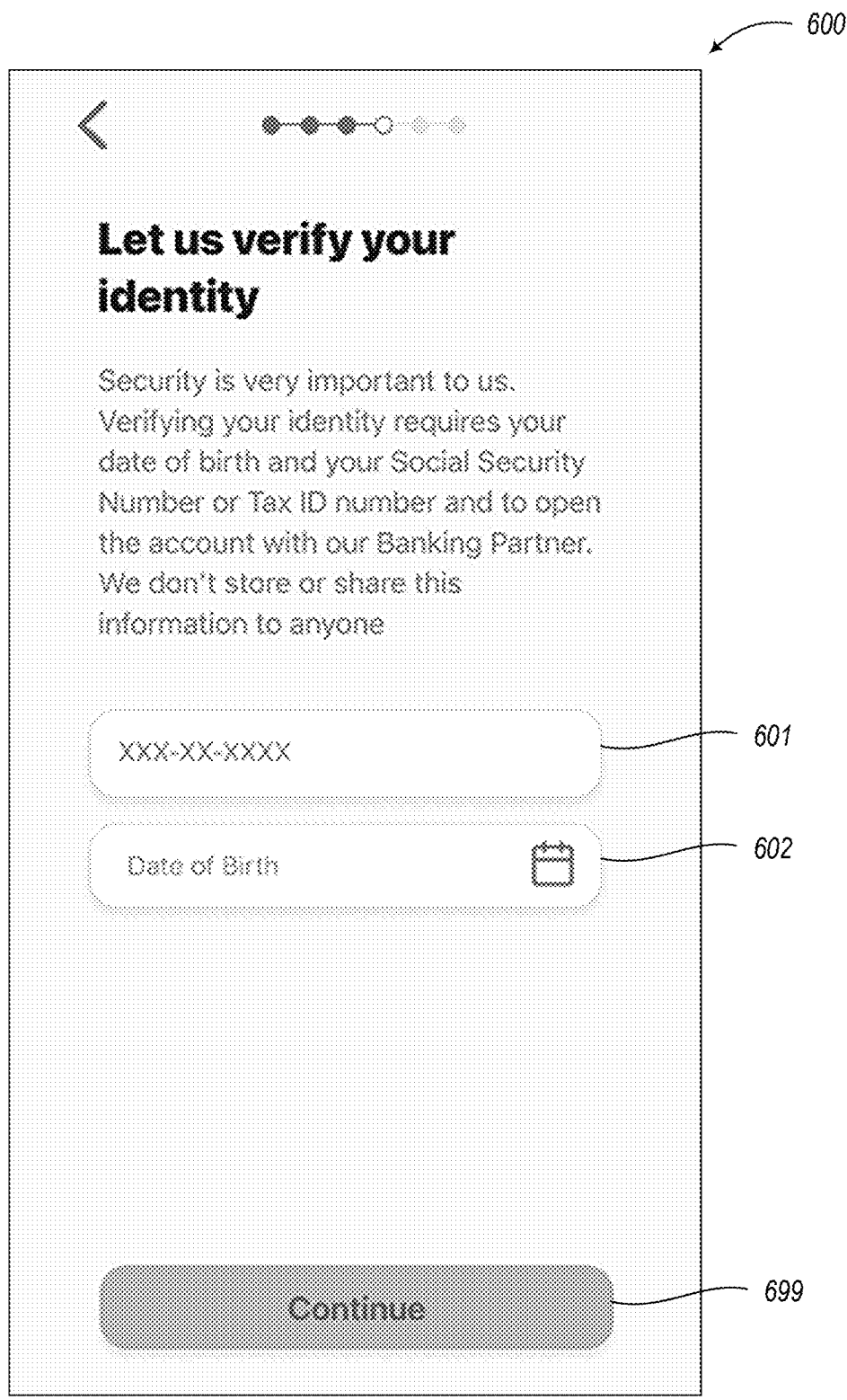
FIG. 6 is a display diagram showing a sample display presented by the facility in some embodiments in order to obtain supplemental identifying information for the freelancer.

FIG. 6 is a display diagram showing a sample display presented by the facility in some embodiments in order to obtain supplemental identifying information for the freelancer. The display 600 includes a field 601 into which the freelancer can enter their social security number, as well as field 602 in which the freelancer can enter their birth date. After entering this information, the freelancer can activate continue control 699 in order to save the entered information and proceed.

Returning to FIG. 4, in act 404, the facility obtains and stores postal address information for the freelancer. In various embodiments, the facility uses this postal address information to confirm the freelancer's identity, send a debit card connected to the account opened by the freelancer by the facility and/or other physical items or correspondence to the freelancer, etc. The facility's performance of act 404 is discussed further below in connection with FIG. 6.

Figure 7:
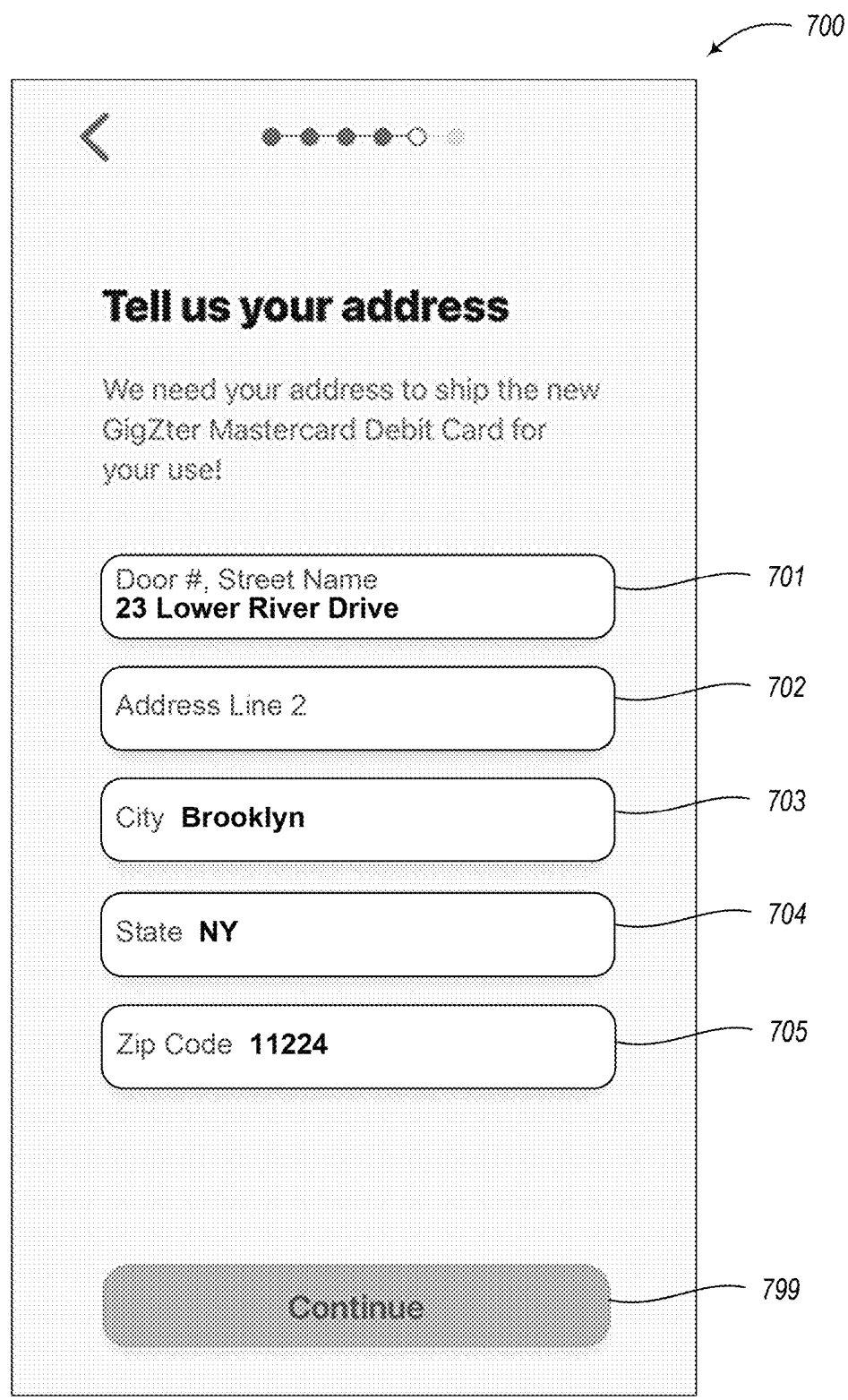
FIG. 7 is a display diagram showing a sample display presented by the facility in some embodiments to obtain postal address information for the freelancer.

FIG. 7 is a display diagram showing a sample display presented by the facility in some embodiments to obtain postal address information for the freelancer. The display 700 includes fields 701 and 702 into which the freelancer can enter their street address; field 703 into which the freelancer can enter their city; field 704 into which the freelancer can enter their state; and field 705 into which the freelancer can enter their zip code. After populating these fields, the freelancer can select continue control 799 in order to save the entered information and proceed.

Returning to FIG. 4, in act 405, the facility uses the collected information about the freelancer to determine the freelancer's eligibility for the account to be provided by the facility. In various embodiments, the facility does so by calling an API exposed by a Know Your Customer solution partner to verify the freelancer's identity based upon the entered information; calling an API exposed by a banking partner to perform one or more forms of checking the freelancer's eligibility to be an account holder, such as an Office of Foreign Assets Control verification process, an Anti-Money Laundering verification process, or an Anti-Terrorist Financing verification process.

In some embodiments, in act 405, the facility calls a mobile number verification API exposed by the Know Your Customer solution partner. The facility passes in mobile number, and the API returns:
  Mobile Number History
  Carrier
  Type
  Risk Score In some embodiments, in act 405, the facility calls a prefill and trust score API exposed by the Know Your Customer solution partner. The facility passes in date of birth or last four digits of Social Security number, and the API returns:
  Full Name
  Address
  Email Address
  Phone number
  SSN
  DOB
  Trust Score In some embodiments, in act 405, the facility calls an identity verification API exposed by the Know Your Customer solution partner. The facility passes in:
  Full Name
  Address
  Email Address
  Phone number
  SSN
  DOB
  Trust Score,
and returns Trust Score.

In some embodiments, in act 405, the facility calls an ANF/ATFF/OFAC screening API exposed by the banking as a service partner. The facility passes in account and cardholder information, and the API returns success or failure.

In act 406, if the facility determines in act 405 that the freelancer is eligible to be an account holder, then the facility continues in act 407, else this process concludes and the freelancer's registration terminates. In act 407, the facility calls an API exposed by a banking partner in order to create an account for the freelancer, and request that the banking partner mail a debit card to the freelancer that is connected to the created account. In its response to this API call, the banking partner returns information about the created account that permits the facility to access its status information, make payments into it, control controllable aspects of it and the debit card, etc.

In some embodiments, in performing act 407, the facility performs the following sequence of API calls:
  The facility calls a create cardholder API exposed by the banking and card processing partner. The facility passes in:
    First Name
    Last Name
    Address (city, state, unit, street, postal code)
    email
    mobile
    ID TYPE (SSN, TIN, EIN)
    ID
    Date of Birth
    income info
    shipping address
    cardholder agreement
    ID acceptance
    Business ID corresponding to master funding account of operator of the facility,
  and returns the freelancer's new cardholder ID.

Next, the facility calls an add an account API exposed by the banking and card processing partner. The facility passes in the new cardholder ID, and the API returns:
  Account ID
  Account Number
  Account Type
  Account Name
  Status
  balance
  creation date
  routing number
  product id Next, the facility calls create cardAPI exposed by the banking and card processing partner. The facility passes in the new cardholder ID, and the API returns:
  Card ID
  Card Number After act 407, this process concludes.

Those skilled in the art will appreciate that the acts shown in FIG. 4 and in each of the flow diagrams discussed herein may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 8:
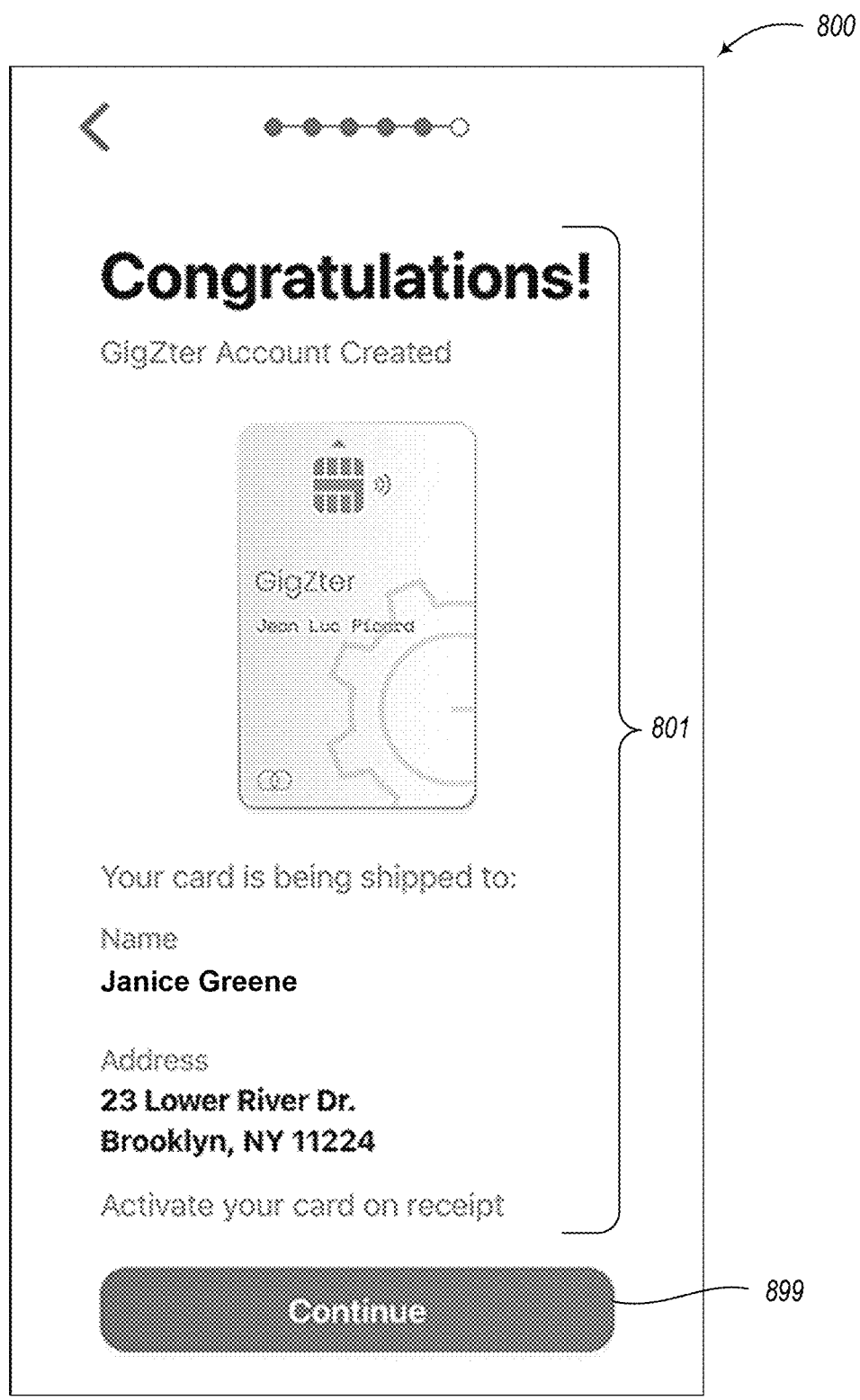
FIG. 8 is a display diagram showing a sample display presented by the facility in some embodiments to inform the freelancer that registration has been successfully completed.

FIG. 8 is a display diagram showing a sample display presented by the facility in some embodiments to inform the freelancer that registration has been successfully completed. Display 800 includes a message 801 informing the use that an account has been created for the freelancer that the freelancer can access via the app, as well as via a debit card that is being mailed to the freelancer at the postal address provided. The user can activate control 899 in order to continue using the app.

Returning to FIG. 3, in act 302, the facility displays a home screen of the app. Act 303 is discussed further blow in connection with FIG. 9.

Figure 9:
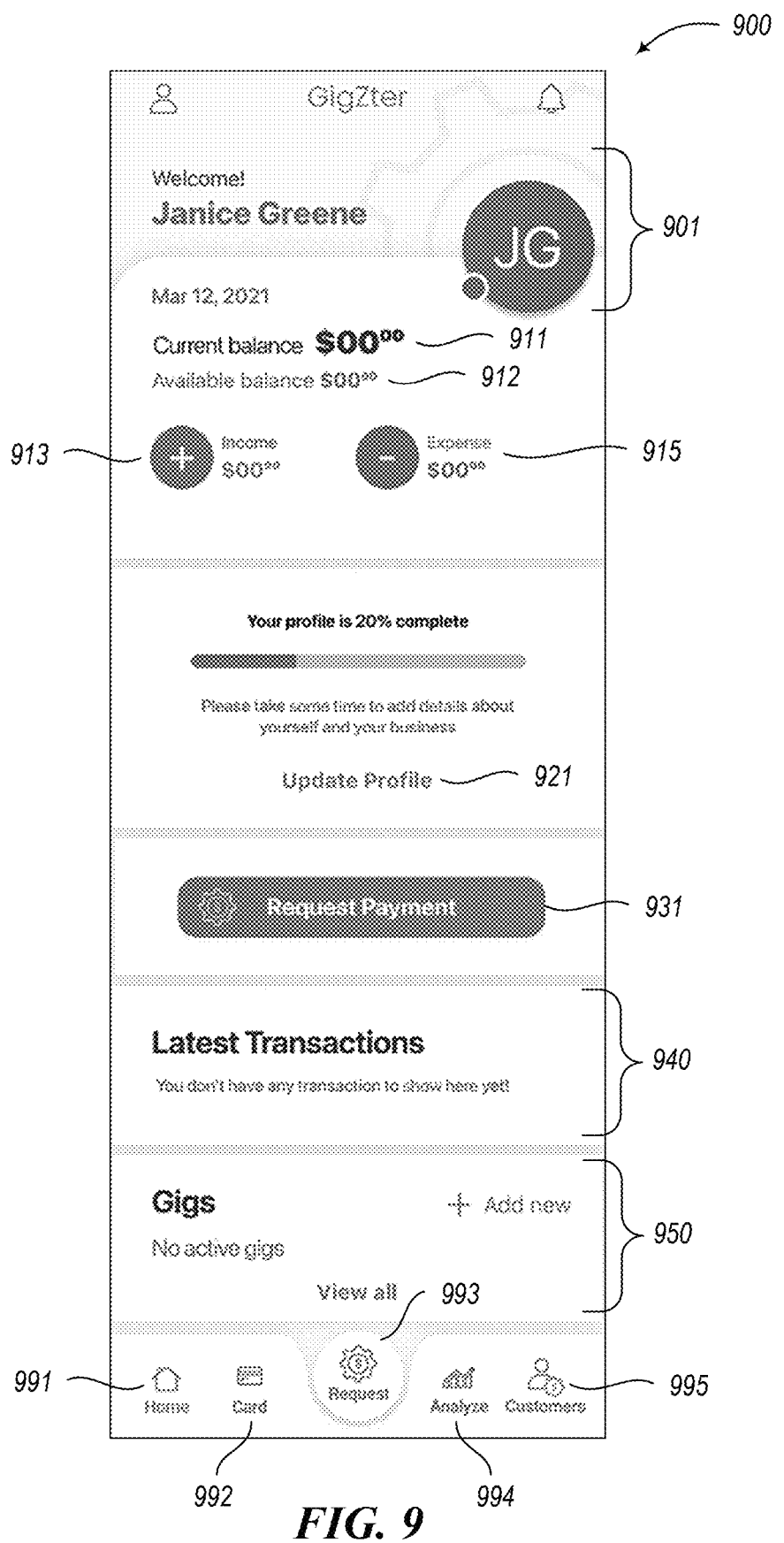
FIG. 9 is a display diagram showing a display presented by the facility in some embodiments to show the home screen of the app in a first state reflecting the freelancer's registration.

FIG. 9 is a display diagram showing a display presented by the facility in some embodiments to show the home screen of the app in a first state reflecting the freelancer's registration. The home screen 900 includes a placeholder 901 for a photo of the freelancer; indications 911 and 912 of a current account balance and available account balance, respectively, both of which are still zero; and indications 913 and 915 of income received in the account via client payments and expenses representing purchases and withdrawals, both of which are still zero. The display further includes a control 921 that the user can activate in order to update their profile; a control 931 that the freelancer can activate in order to create a payment request; a placeholder 940 for recent transactions against the freelancer's account; a section 950 showing active gigs; and navigation controls 991-995. In some embodiments, these navigation controls are persistent across the displays presented by the facility in the application, and permit the freelancer to jump to different functions or areas of the app: the freelancer can activate control 991 to reach the present page; control 992 in order to view card and account details, such as balances, account number, routing number, last four digits of card number, etc., as well as card-specific actions such as activating and deactivating the card, reporting the card as lost or stolen, etc.; control 993 to generate a new payment request, or view existing payment requests; control 994 in order to analyze information about account balance, income, expenses, etc.; and control 995 in order to view information about clients, add or update client details, see recent projects for each client, add new clients or projects, etc.

Returning to FIG. 3, in act 303, the facility receive user input from the freelancer, and branches on. In act 303, if the freelancer provides user input selecting update profile control 921, then the facility continues in act 304. In act 304, the facility sets up the profile for the freelancer's business. Additional information about act 304 is discussed below with respect to FIG. 10.

Figure 10:
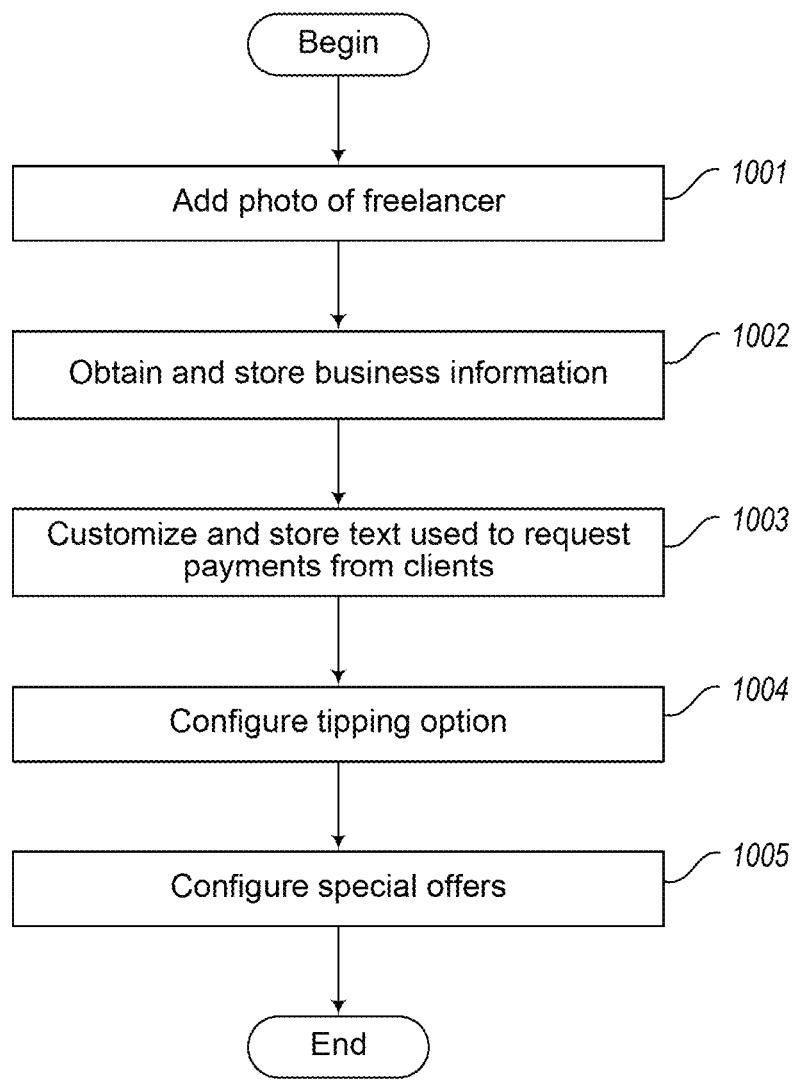
FIG. 10 is a flow diagram showing a process performed by the facility in some embodiments to set up a business profile for the freelancer.

FIG. 10 is a flow diagram showing a process performed by the facility in some embodiments to set up a business profile for the freelancer. In some embodiments, the facility performs this process in response to the freelancer's activation of update profile control 921 shown in FIG. 9. In act 1001, the facility adds a photo of the freelancer. The facility's performance of act 1001 is discussed further below in connection with FIGS. 10 and 11.

Figure 11:
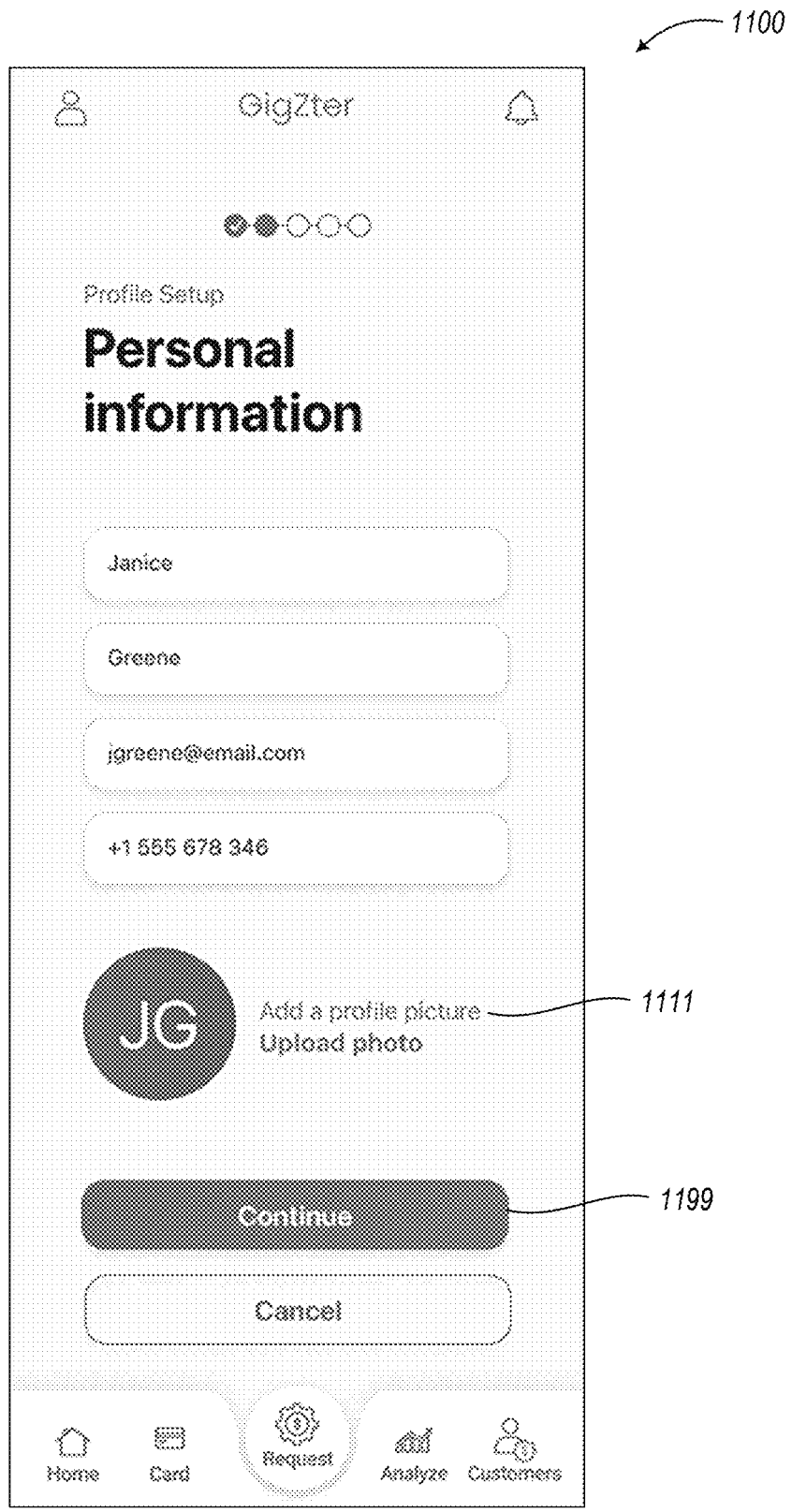
FIG. 11 is a display diagram showing a sample display presented by the facility in some embodiments in order to provide an opportunity to the freelancer to provide a photo of themself.

FIG. 11 is a display diagram showing a sample display presented by the facility in some embodiments in order to provide an opportunity to the freelancer to provide a photo of themselves that, in various embodiments, the facility shows in the app, in payment requests sent to clients, and in various other ways. The display 1100 includes a control 1111 that the freelancer can activate in order to provide such a photo. Alternatively, the freelancer can activate control 1199 to proceed without providing a photo.

Figure 12:
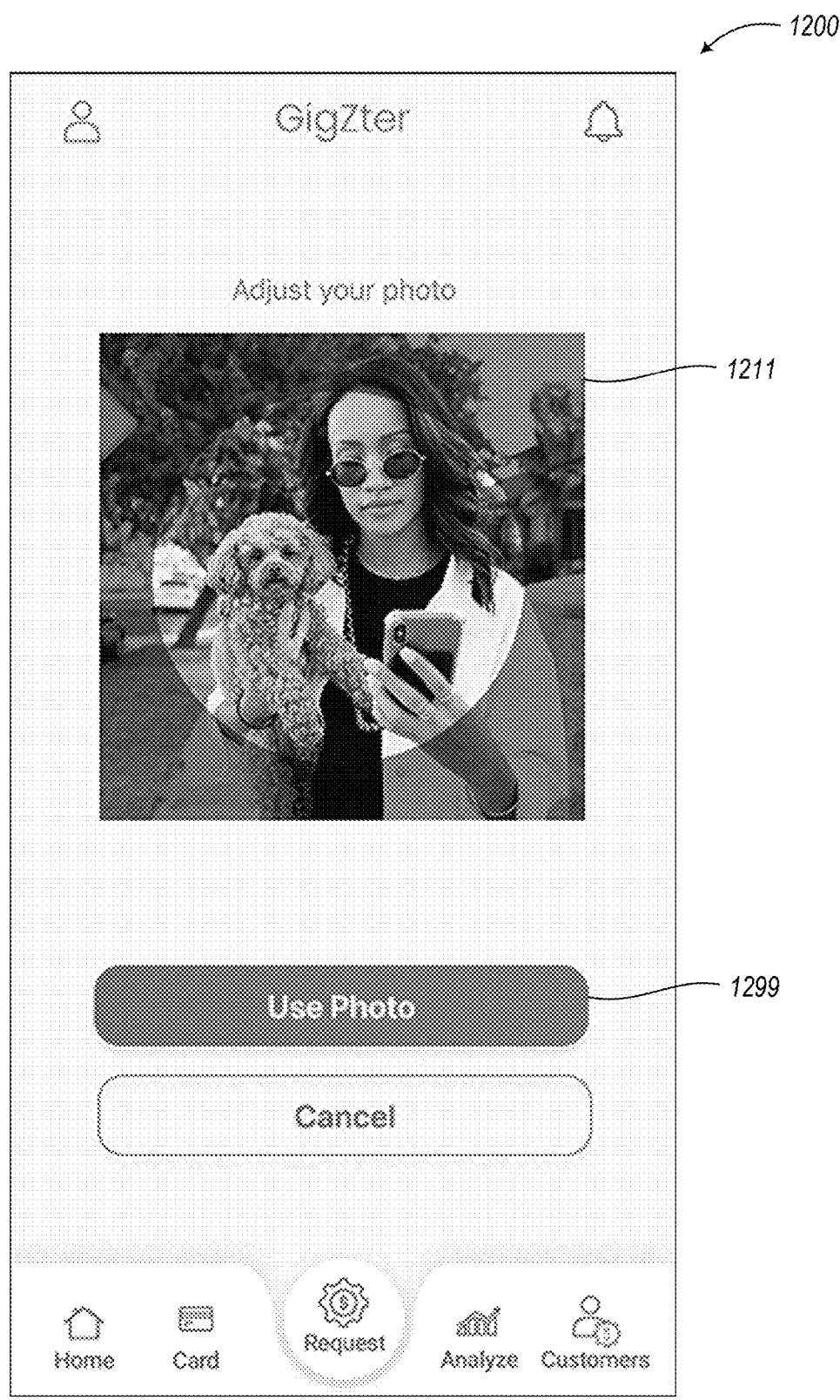
FIG. 12 is a display diagram showing a sample display presented by the facility in some embodiments to take a new photo to provide to the facility or select an existing photo.

FIG. 12 is a display diagram showing a sample display presented by the facility in some embodiments to take a new photo to provide to the facility or select an existing photo. The display 1200 includes a photo 1211 that the freelancer has either used their mobile device's camera to capture from within the application, or used their mobile device's photo gallery to select an earlier-captured photo (not shown). In some embodiments, the user can select the size and position of a cropping window in order to select a portion of the photo that will be used by the facility. The user can activate control 1299 to use the photo as shown and proceed.

Returning to FIG. 10, in act 1002, the facility obtains and stores information about the freelancer's business. The facility's performance of act 1002 is discussed further below in connection with FIG. 13.

Figure 13:
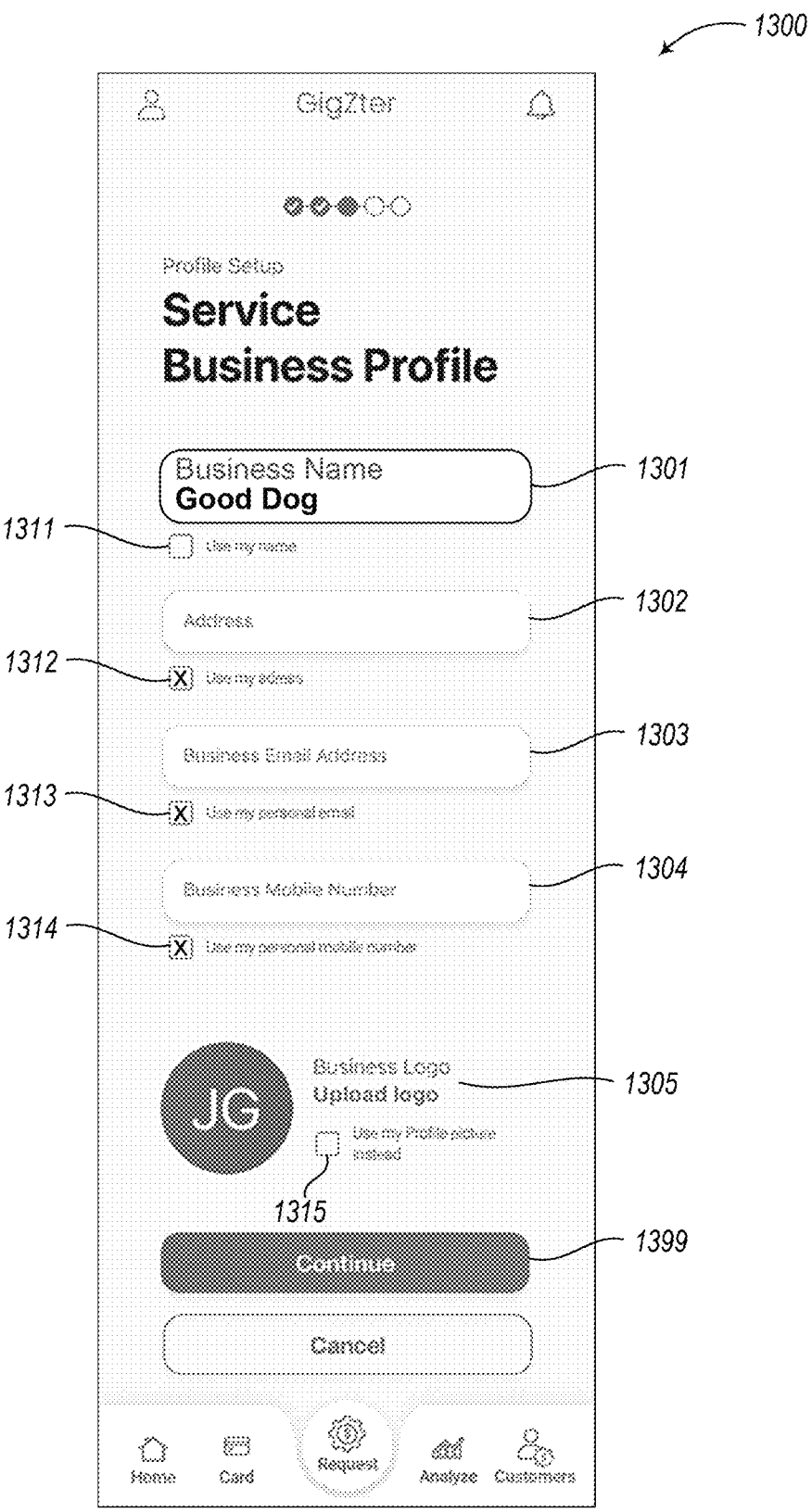
FIG. 13 is a display diagram showing a sample display presented by the facility in some embodiments to obtain information about the freelancer's business.

FIG. 13 is a display diagram showing a sample display presented by the facility in some embodiments to obtain information about the freelancer's business. The display 1300 includes a field 1301 where the freelancer can enter the name of their business. Alternatively, the freelancer can check box 1311 to use their own name as the business name. The display includes similar fields 1302-1304 in which their can enter the business's postal address, email address, and mobile phone number, respectively. As an alternative of any of these, the freelancer can check any of boxes 1312-1314 to use the corresponding information about the freelancer for the business. The display also includes a control 1305 in order to provide an image of the business's logo, and a corresponding checkbox 1315 that the freelancer can check in order to use the freelancer photo as the business logo. The freelancer can activate control 1399 to save the provided information and proceed.

Returning to FIG. 10, in act 1003, the facility customizes and stores text used to request payments from clients in response to information entered by the freelancer. The facility's performance of act 1003 is discussed further below in connection with FIG. 14.

Figure 14:
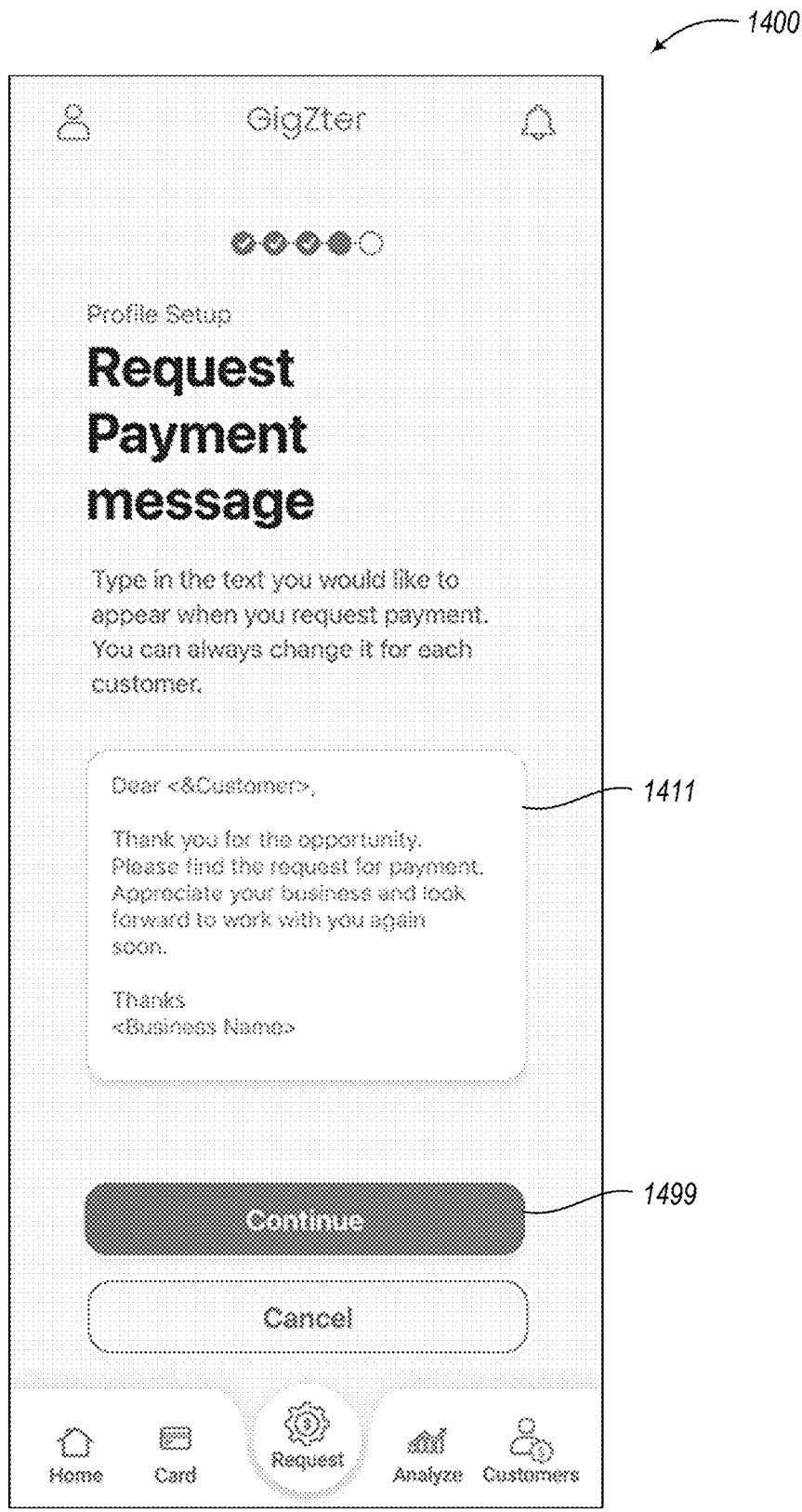
FIG. 14 is a display diagram showing a sample display presented by the facility in some embodiments to tailor a payment request message for sending by the freelancer to the freelancer's clients.

FIG. 14 is a display diagram showing a sample display presented by the facility in some embodiments to tailor a payment request message to the freelancer. The display 1400 includes a text box 1411 into which the freelancer can enter a message to be included in each payment request message sent to a client by the facility for the freelancer. In some embodiments, the facility populates the text box with default text that can be customized by the freelancer. When the freelancer is satisfied with the contents of the payment request message, they can activate control 1499 to save the payment request message and proceed.

Return to FIG. 10, in act 1004, the facility configures a tipping option by indicating whether each payment request sent by the facility for the freelancer should, by default, present an opportunity to the client that receives to tip the freelancer by paying a specified extra amount above the requested amount. In act 1005, the facility configures special offers that are to, by default, be included in payment requests sent by the facility for the freelancer, for example to give the client that receives the payment request a discount on future projects. The facility's performance of acts 1004 and 1005 is discussed further below in connection with FIG. 15. After act 1005, this process concludes.

Figure 15:
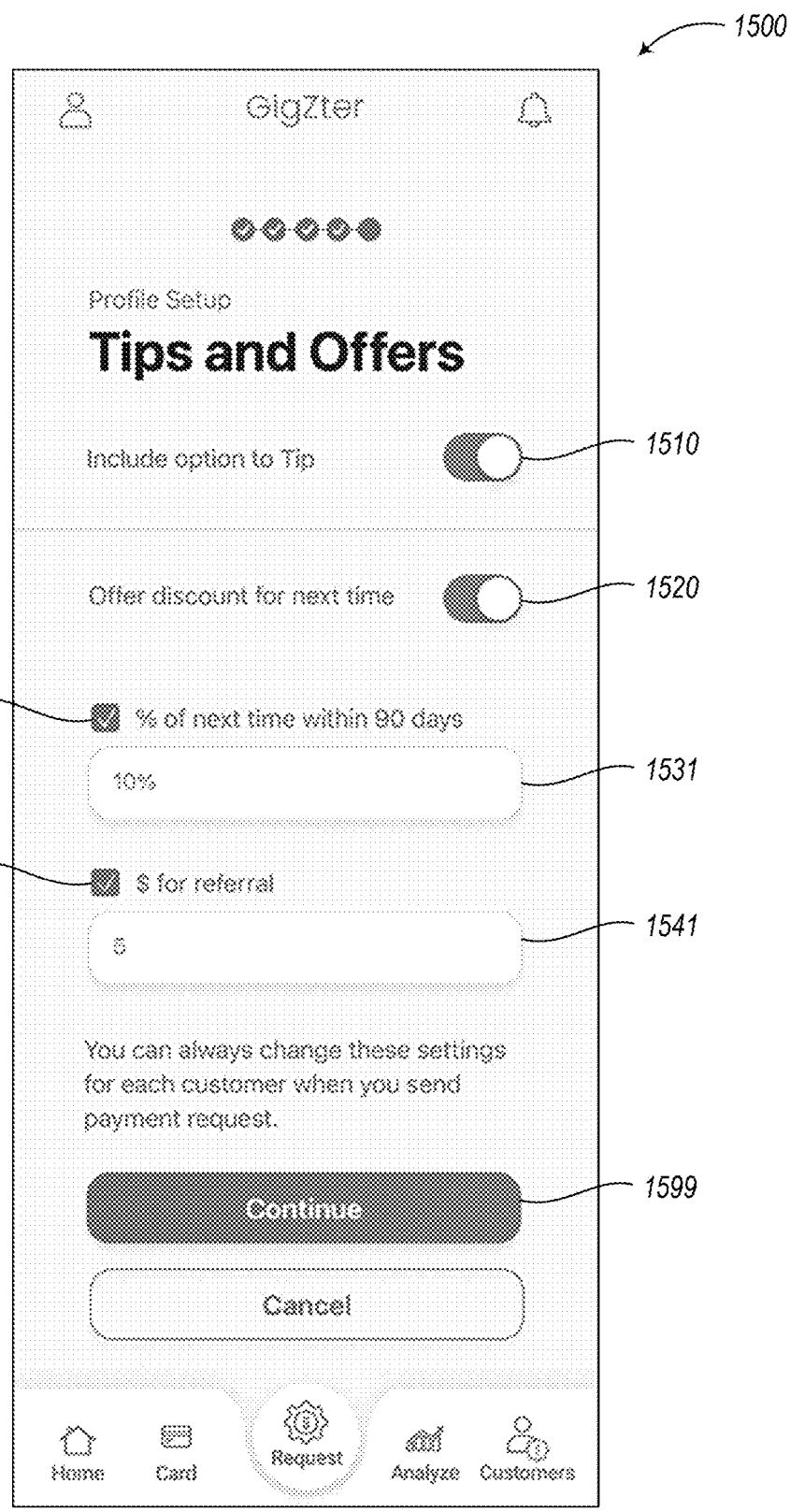
FIG. 15 is a display diagram showing a sample display presented by the facility in some embodiments to configure tipping options and special offers.

FIG. 15 is a display diagram showing a sample display presented by the facility in some embodiments to configure tipping options and special offers. The display 1500 includes a control 1510 that the freelancer can operate in order to enable or disable the facility's inclusion of a tipping option. The display also includes a control 1520 that the freelancer can operate in order to specify whether payment requests will include discount offers, such as discount offers for future projects. Where discount offers are enabled, the freelancer can check box 1532 in order to turn on an offer providing percentage discounts for projects performed within the next 90 days, and enter a particular percentage in field 1531. Similarly, the freelancer can check box 1542 to turn on an offer for referring additional clients and enter in field 1541 a dollar amount of a discount to be provided for each such referral. In some embodiments, the facility or the freelancer establishes discount offers of various types that can be included in payment requests sent to clients. In some embodiments, the default settings that established by the freelancer interacting with these controls can be overridden by the freelancer for particular payment requests. After performing this configuration, the freelancer can activate control 1599 to save the information and proceed.

Returning to FIG. 3, after setting up the profile in act 304, the facility continues in act 302 to display the home screen.

In act 303, if the freelancer issues a send payment request, such as by activating control 931 shown in FIG. 9, then the facility continues in act 305. In act 305, the facility constructs a payment request for a particular client based upon input from the freelancer, and sends it to that client. The facility's performance of act 305 is discussed below in connection with FIG. 16.

Figure 16:
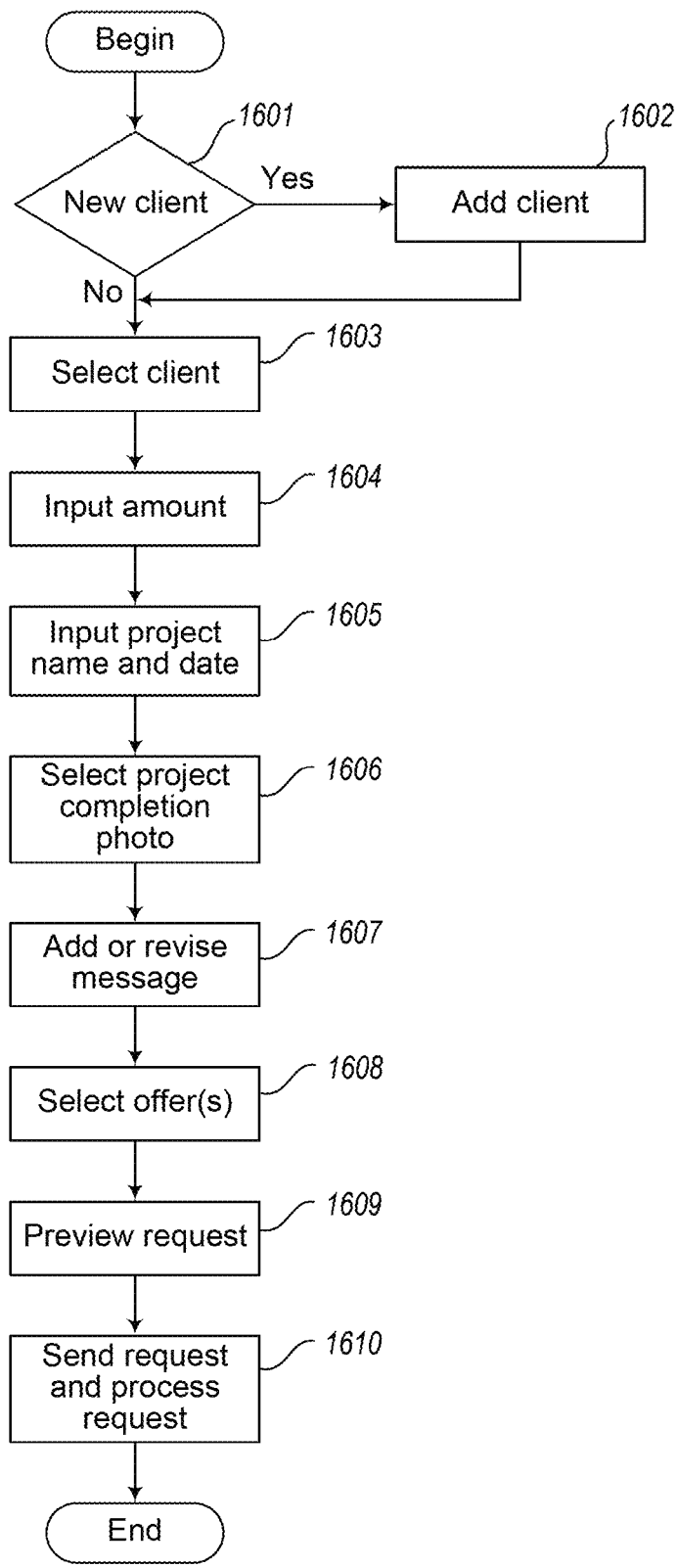
FIG. 16 is a flow diagram showing a process performed by the facility in some embodiments to construct and send a payment request.

FIG. 16 is a flow diagram showing a process performed by the facility in some embodiments to construct and send a payment request. In act 1601, if the client to whom the payment request is a new client, then the facility continues in act 1602, else the facility continues in act 1603. In act 1602 adds the client for which the present payment request is being prepared to the list of clients that the facility maintains for the freelancer. The facility's performance of act 1602 is discussed further below in connection with FIG. 17.

Figure 17:
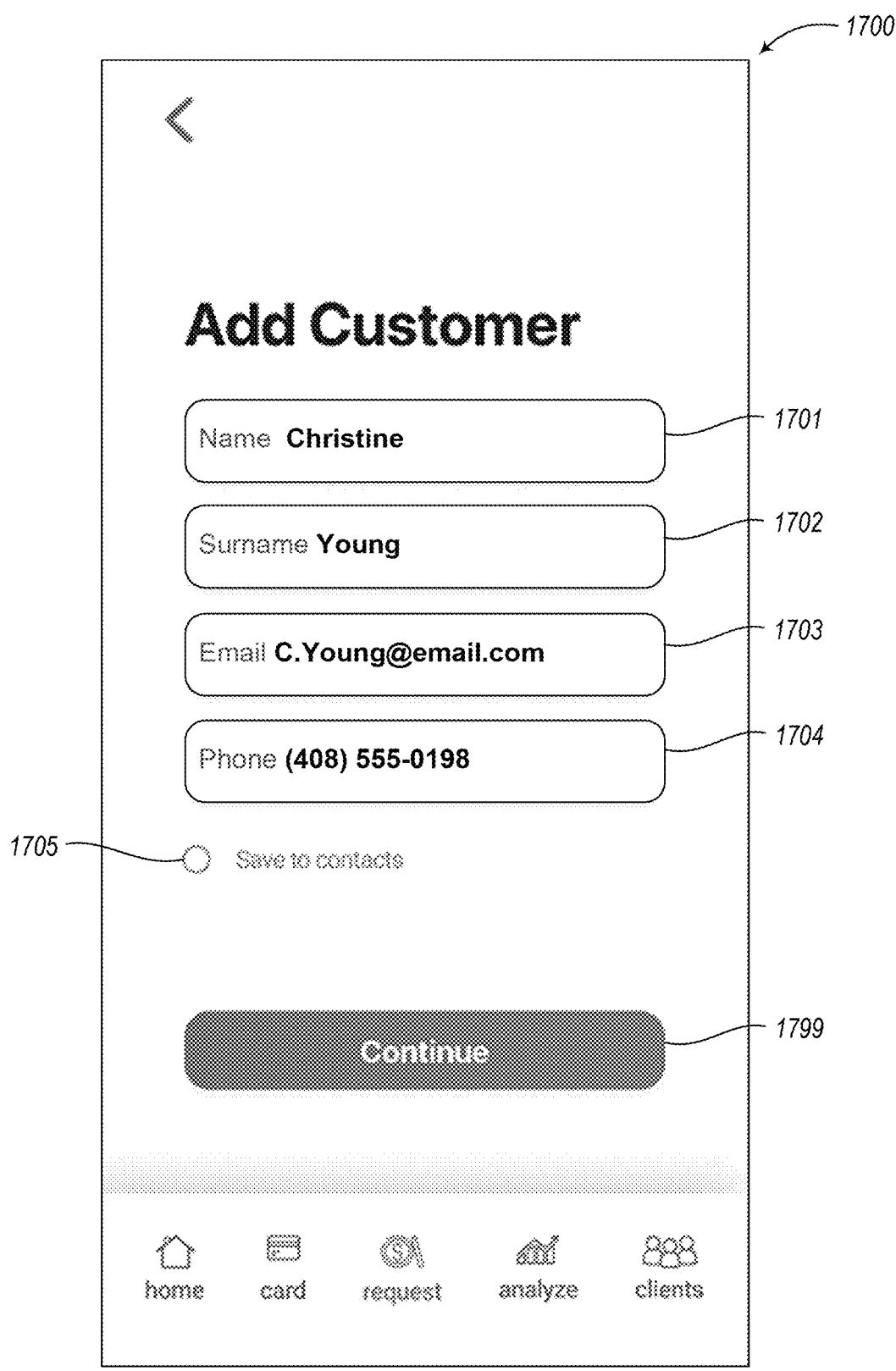
FIG. 17 is a display diagram showing a sample display presented by the facility in some embodiments to add a new client to the list of clients that the facility maintains for a freelancer.

FIG. 17 is a display diagram showing a sample display presented by the facility in some embodiments to add a new client to the list of clients that the facility maintains for a freelancer. The display 1700 includes fields 1701-1704 into which the freelancer can enter the new client's first name, last name, email address, and mobile phone number, respectively. The display includes a control 1705 that the freelancer can activate in order to save the entered information into the list of contacts maintained by the freelancer's mobile device. Once complete, the freelancer can activate continue control 1799 to save this information and proceed.

Returning to FIG. 16, after act 1602, the facility continues in act 1603. In act 1603, the facility selects a client for whom to prepare a payment request based upon input from the freelancer. The facility's performance of act 1603 is discussed further below in connection FIG. 18.

Figure 18:
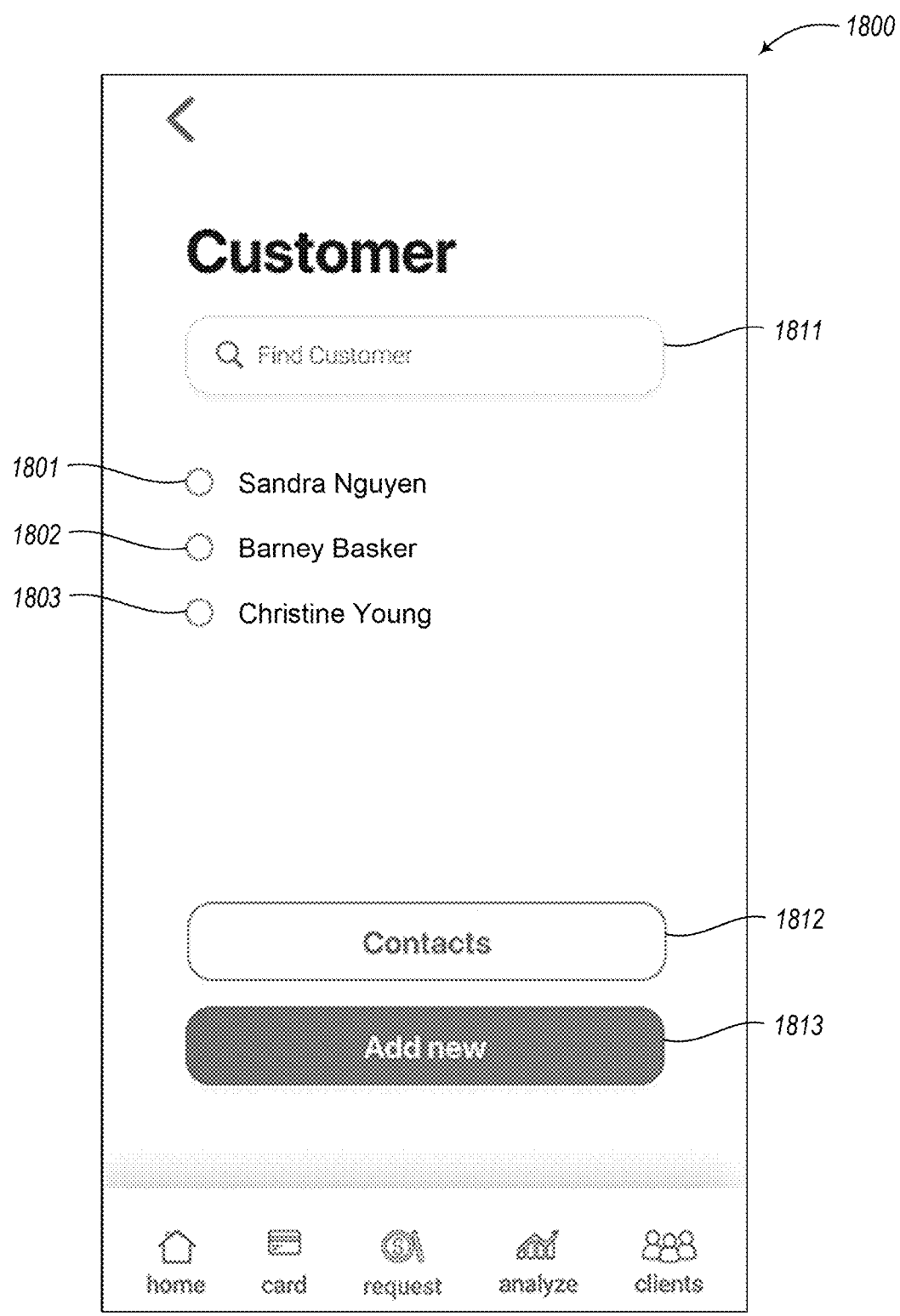
FIG. 18 is a display diagram showing a sample display presented by the facility in some embodiments in order to enable a freelancer to choose an existing client or add a new client for whom to prepare a payment request.

FIG. 18 is a display diagram showing a sample display presented by the facility in some embodiments in order to enable a freelancer to choose a client for whom to prepare a payment request. The display 1800 includes the name 1801-1803 of existing clients of the freelancer; the freelancer can choose any of these in order to proceed with generating a payment request for the existing client. Where the list is long, the freelancer can enter all or part of the client's name in field 1811 to search for the client. The freelancer can activate control 1812 in order to select a new client from among the list of contacts maintained by the freelancer mobile device. The freelancer can activate control 1813 in order to add a new client to the list of clients.

Returning to FIG. 16, In act 1604, the facility receives input from the freelancer specifying the amount of the payment request. The facility's performance of act 1604 is discussed further below in connection with FIG. 19.

Figure 19:
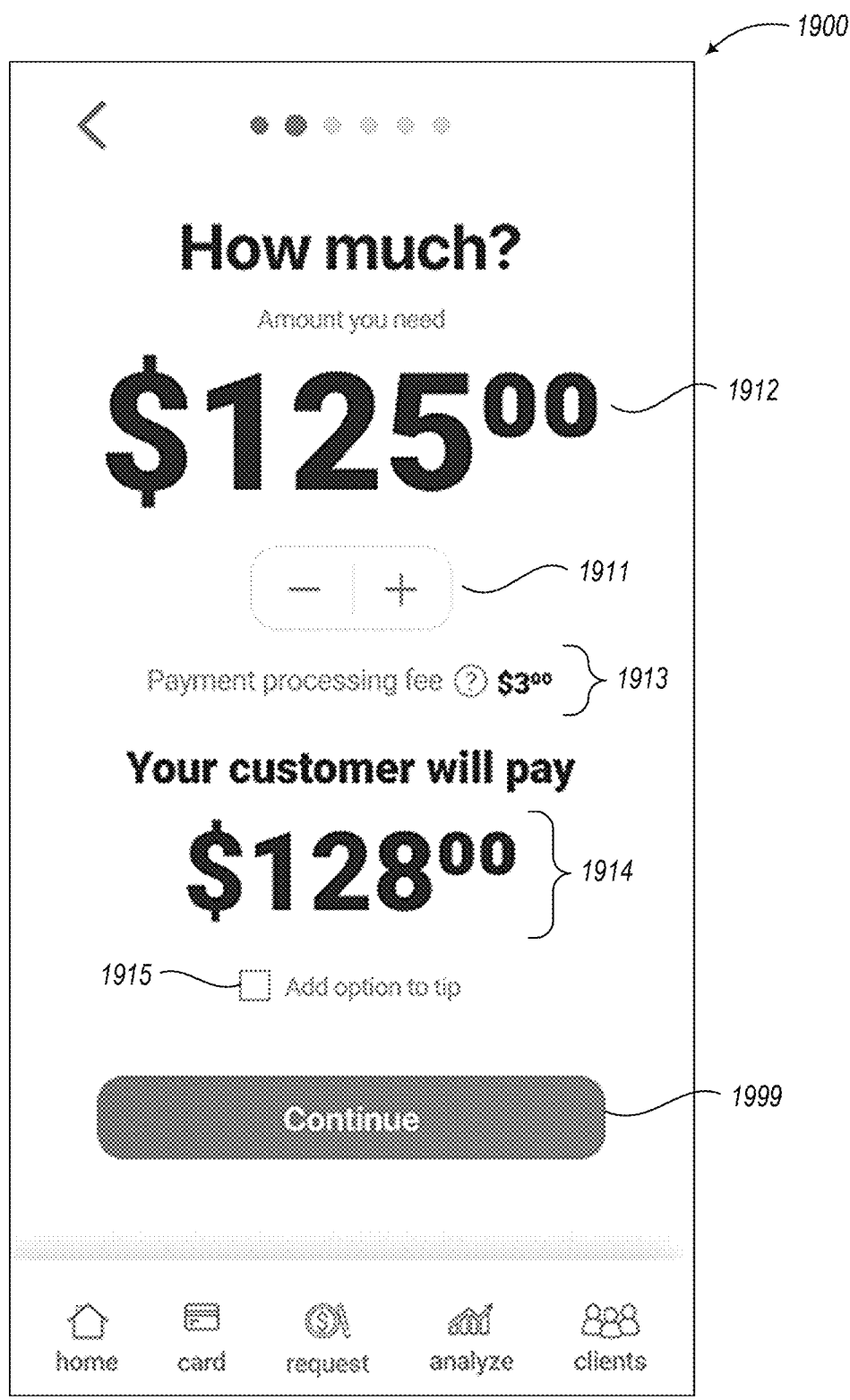
FIG. 19 is a display diagram showing a sample display presented by the facility in some embodiments in order to enable the freelancer to specify an amount of money to be requested in a payment request being generated for a client to include in the payment request.

FIG. 19 is a display diagram showing a sample display presented by the facility in some embodiments in order to enable the freelancer to specify an amount of money to be requested in a payment request being generated for a client. The display 1900 includes an amount 1912 that the freelancer can adjust in a variety of ways, such as using up/down control 1912, typing a new amount on a keypad, etc. The display includes an indication 1813 of a processing fee that the operators of the facility will impose on the payment. In some embodiments this processing fee is paid by the client in addition to the amount specified by the freelancer; in some embodiments this processing is paid by the freelancer, and thus not by the client. The display includes an indication 1914 of the total that the customer will be asked to pay, considering any processing fee charged to the client. The freelancer can check or uncheck box 1915 to specify whether the payment request will provide an opportunity for the client to tip the freelancer an additional amount. In some embodiments, box 1915 is initially checked or unchecked in accordance with the default specified by the freelancer in act 1004 shown in FIG. 10, which the freelancer can proceed to change during the presentation of display 1900. After the freelancer has completed these steps, the freelancer can activate continue control 1999 to save the established information and proceed.

Returning to FIG. 16, in act 1604, the facility receives from the freelancer a name for the project for which the freelancer is requesting payment, and the date on which it was performed. In act 1606, the facility selects one or more photos showing performance for completion of the project to include in the payment request. These can be captured using the mobile device by the freelancer at this point in the process of creating the payment request, or selected by the freelancer from photos earlier captured using the mobile device (not shown). The facility's performance of acts 1605 and 1606 is discussed further below in connection with FIG. 20.

Figure 20:
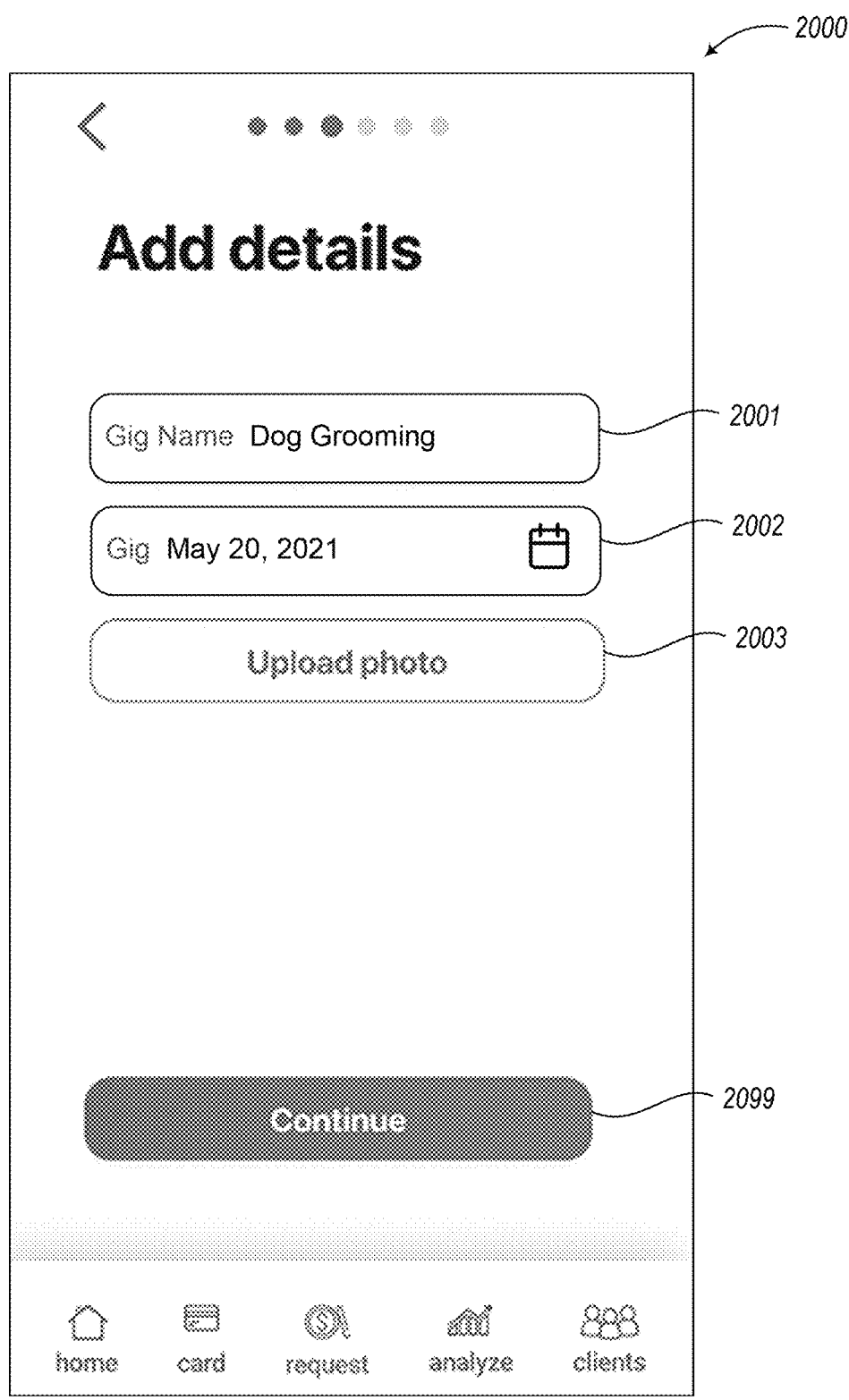
FIG. 20 is a display diagram showing a sample display presented by the facility in some embodiments to obtain project name, date, and photos from the freelancer.

FIG. 20 is a display diagram showing a sample display presented by the facility in some embodiments to obtain project name, date, and photos from the freelancer. The display 2000 includes a field 2001 for entering a project name to include in the payment request, and a field 2002 for selecting a project date to identify in the payment request. The display also includes a control 2003 at the freelancer can operate to take or select one or more photos showing performance or completion of the project, such as dogs in the process of being walked or dogs after being walked. The freelancer can activate continue control 2099 to save the entered information and proceed.

Returning to FIG. 16, in act 1607, the facility adds or revises a textual message to the client to include in the payment request. The facility's performance of act 1607 is discussed further below in connection with FIG. 21.

Figure 21:
FIG. 21 is a display diagram showing a sample display presented by the facility in some embodiments to create or revise a textual message to be included in the payment request.

FIG. 21 is a display diagram showing a sample display presented by the facility in some embodiments to create or revise a textual message to be included in the payment request. The display 2100 includes a field 2101 in which the freelancer can enter the textual message to be included. In some embodiments, the facility prepopulates field 2101 with the default textual message established by the facility in act 1003 shown in FIG. 10; the freelancer can then edit this default textual message in order to obtain the textual message they wish to be included in this payment request. In some embodiments, the freelancer uses an on-screen keyboard 2110, or voice text input or a physical keyboard (not shown), to enter or edit the textual message in field 2101. After completing the textual message, the freelancer activates continue control 2199 to proceed.

Returning to FIG. 16, in act 1608, the facility selects any offers that are to be included in the payment request. The facility's performance of act 1608 is discussed below in connection with FIG. 22.

Figure 22:
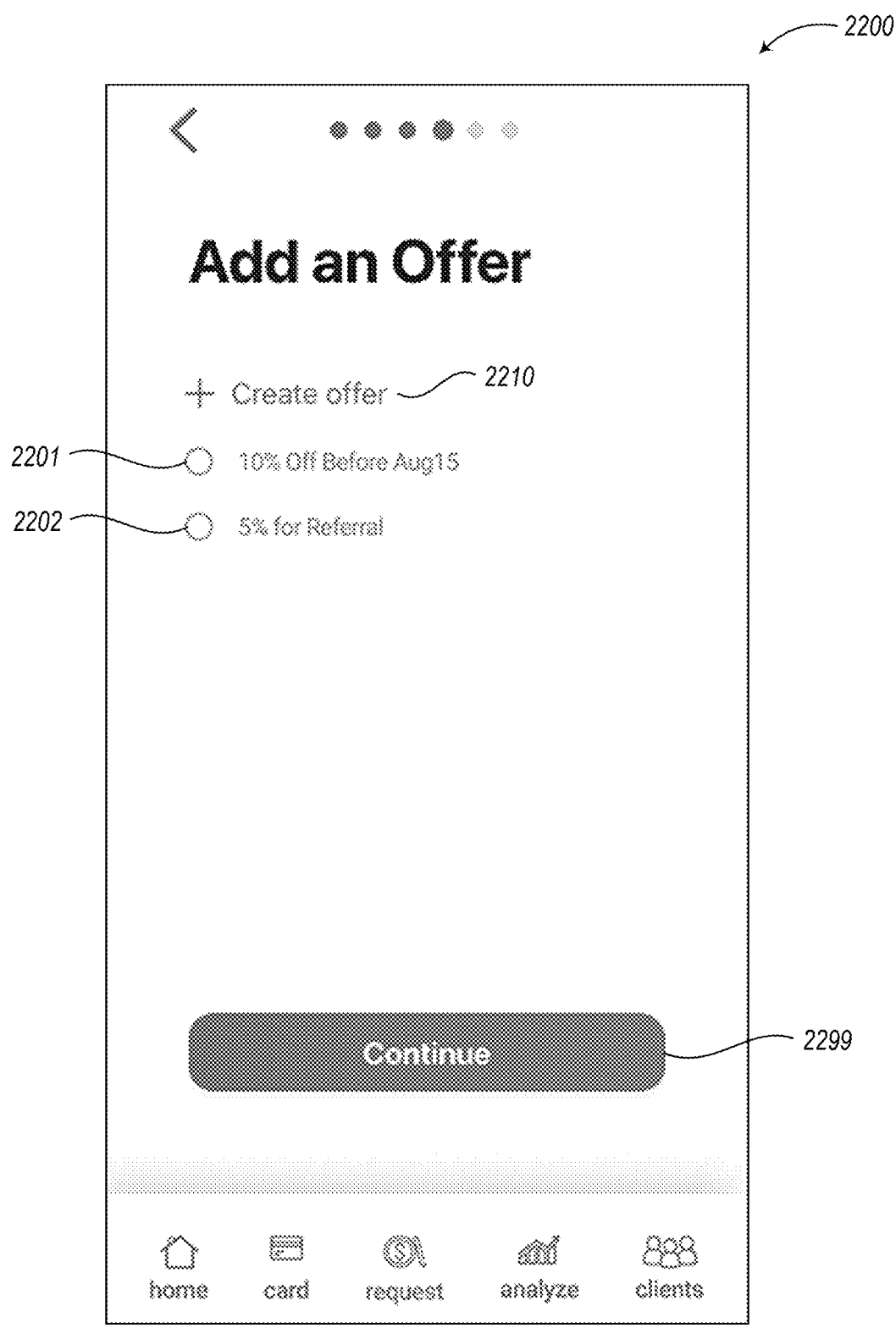
FIG. 22 is a display diagram showing a sample display presented by the facility in some embodiments in order to select offers to include in the payment request.

FIG. 22 is a display diagram showing a sample display presented by the facility in some embodiments in order to select offers to include in the payment request. The display 2200 contains indications 2201 and 2202 of the types of offers presently available. The freelancer can select one or both of these in order to include the corresponding offer in the payment request. Additionally, the freelancer can activate control 2210 to create a new type of offer, that can then also be selected in the same way for inclusion in the payment request. After doing so, the freelancer activates control 2299 in order to proceed.

Returning to FIG. 16, in act 1609, the facility previews a payment request that it has generated based upon the information collected in acts 1603-1608. In various embodiments, the preview request is created by the facility by: setting variable values for an HTML or XML payment request template that will cause a webpage containing the template to be displayed in accordance with the details of the request determined by the facility based upon the freelancer input; generating a hardcoded rendered instance of the webpage in which the variable values are used to transform the template into a webpage whose HTML source no longer relies on the variable values and doesn't include deselected aspects of the template; etc. The facility's performance of act 1609 is described further below in connection with FIG. 23.

Figure 23:
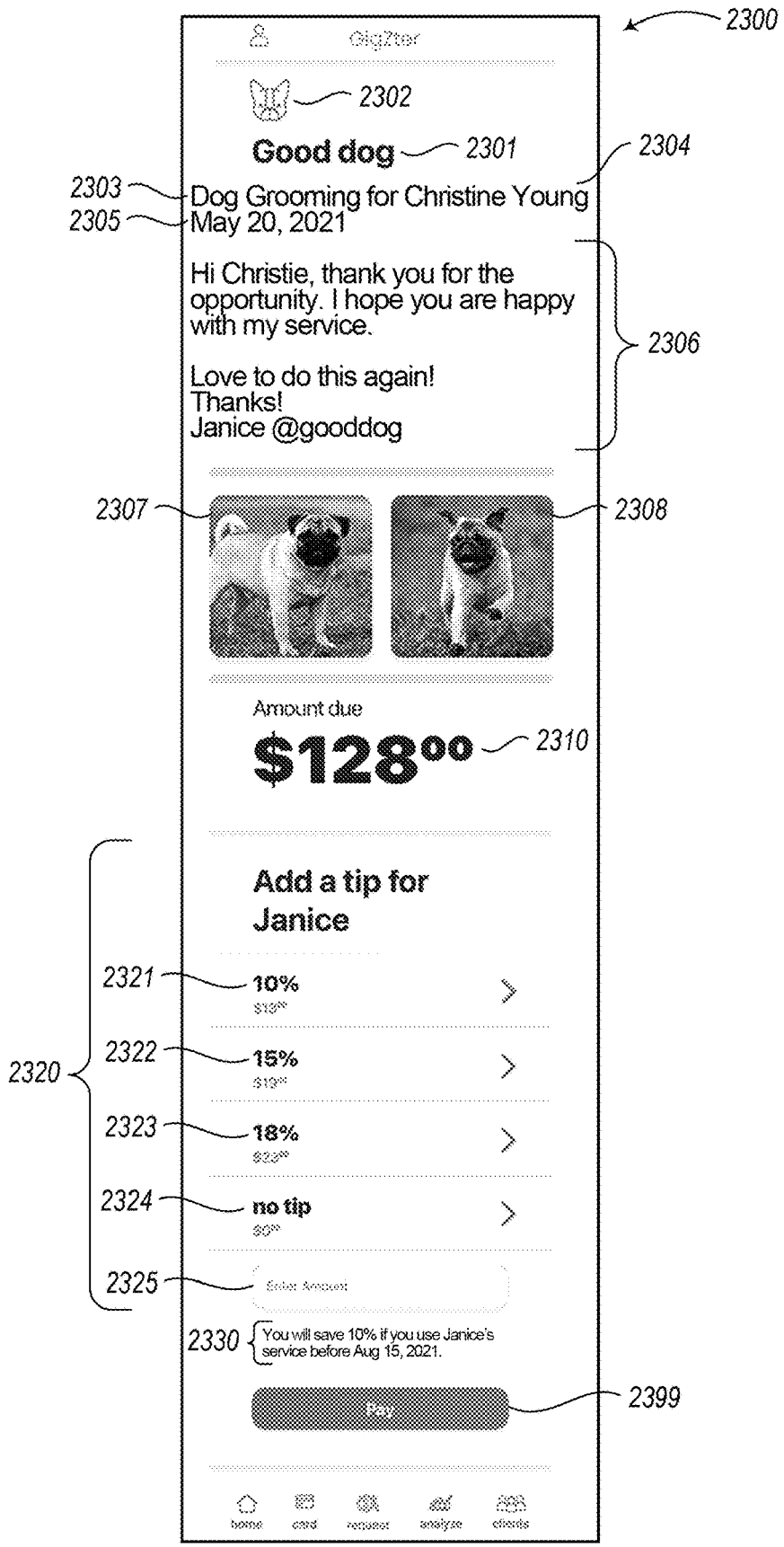
FIG. 23 is a display diagram showing a sample display presented by the facility in some embodiments to enable the freelancer to preview the generated payment request as it will appear to the client who receives it.

FIG. 23 is a display diagram showing a sample display presented by the facility in some embodiments to preview the generated payment request. The display 2300 includes the freelancer's business name 2301 and business logo 2302. It further includes the project name 2303, the client name 2304, and the project date 2305. It further includes the textual message 2306 and completion photos 2307 and 2308. It also includes an indication 2310 of the amount due—including any processing fees assessed against the client—and a section 2320 that the client can use in order to specify an amount for a tip to be paid by the client to the freelancer. These include fixed percentages in corresponding amounts 2321-2324, as well as a field 2325 where the client can enter a custom amount for the tip. The display also includes an offer 2330 selected for the payment request by the freelancer. The display also includes pay control 2399 that the client can activate in order to initiate the payment. In some embodiments (not shown), preview display 2300 includes a control that the freelancer can use in order to return to earlier steps in creating the payment request in order to alter one or more details of the payment request shown in the preview.

Returning to FIG. 16, in act 1610, the facility sends the payment request to the client and processes the request and the client's responsive payment. The facility's performance of act 1610 is discussed further below in connection with FIG. 24.

Figure 24:
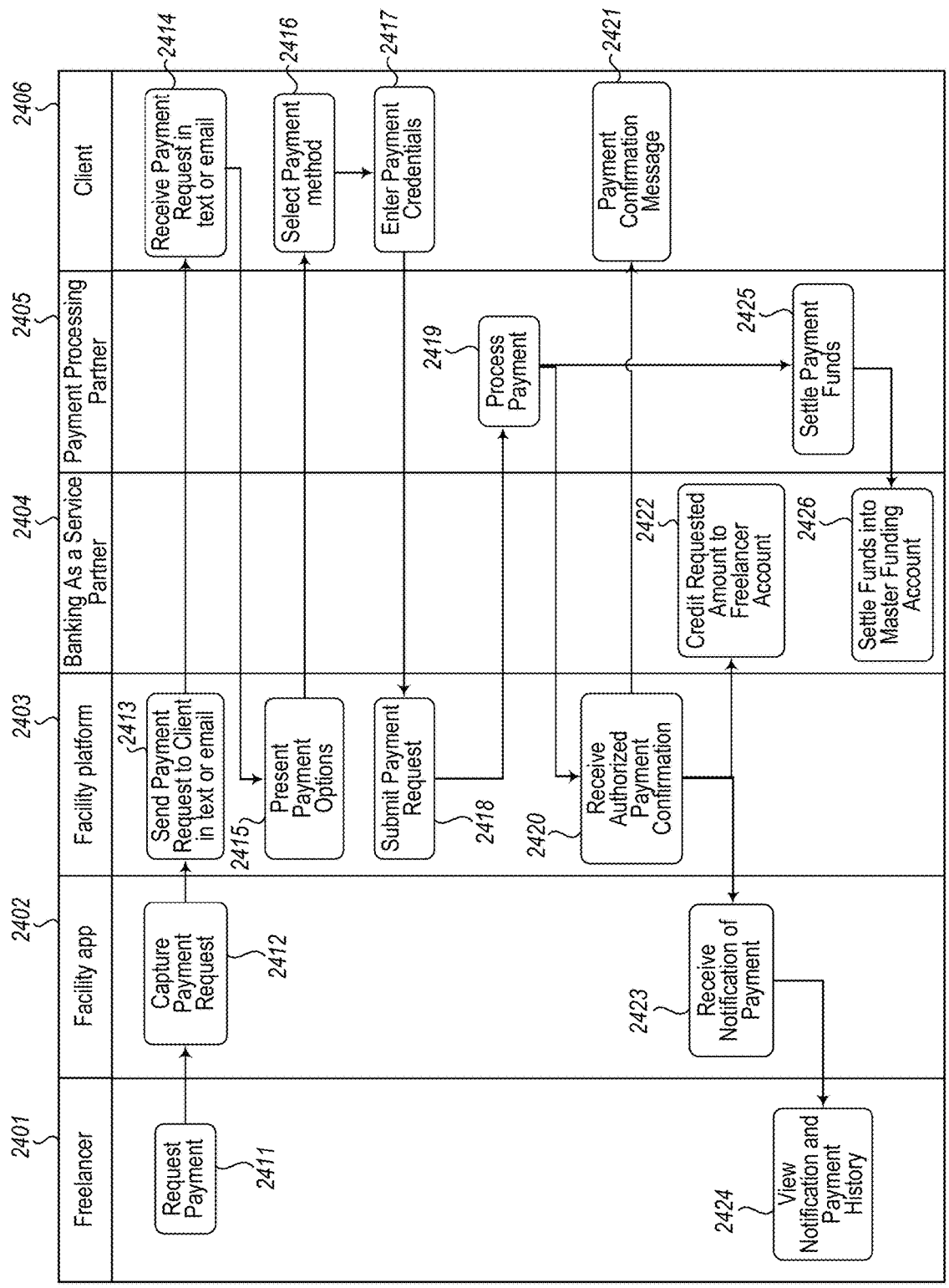
FIG. 24 is a process and data flow diagram that shows the interaction of the facility with different users and partners in order to convey the payment request to the client and process the client's responsive payment.

FIG. 24 is a process and data flow diagram that shows the interaction of the facility with different users and partners in order to deliver the payment request to the client and process the client's responsive payment. The diagram shows six columns, each corresponding to a different entity involved in this process. Column 2401 corresponds to the user who is the freelancer requesting payment; column 2402 corresponds to the instance of the facility's mobile app installed on the freelancer's mobile device; column 2403 corresponds to the facility's backend server, such as a private dedicated hardware server, a rented dedicated or shared hardware server, virtual machines provided by a cloud service, etc.; column 2404 corresponds to a server operated by or on behalf of a banking as a service partner; column 2405 corresponds to a server operated by or on behalf of a payment processing partner; and column 2406 corresponds to a mobile or desktop device used by a user who is the client to whom the payment request is directed.

In act 2411, the freelancer interacts with the app to request payment from the client, as discussed above in connection with FIGS. 15-22. In act 2412, the facility in its mobile app captures the payment request specified by the freelancer. The app contacts the facility platform to instruct the facility platform to send the payment request to the client. In act 2413, the facility platform sends the payment request to the client, such as by sending an SMS or email message to the client whose contents explain to the message relates to a payment request being made of the client and contains a link to a webpage showing the payment request. In some embodiments (not shown), this SMS or email message is sent by the facility by calling a API exposed by a messaging service, which itself composes and/or sends the message. In act 2414, the payment request sent in act 2413 is received by the client in the client's mobile device, desktop computer, etc. When the client follows the link in the message, in act 2414, the facility platform receives an HTTP request identifying a URL containing the link, and in response serves one or more webpages to the client device that relate to the payment request, including a display of the payment request, a list of available payment options, and any webpages needed in order to collect from the client payment information needed in order to compose a payment order that is fully formed for the selected payment method. In act 2416, the client selects their preferred payment method from the list provided by the facility, and in act 2417 enters any payment credentials needed for this payment method. These are received by the client platform, which in act 2418 submits a payment order containing the amount and credentials to the payment processing partner.

In some embodiments, in act 2418, the facility performs the following sequence of API calls:

The facility calls a create customer API exposed by the payment gateways partner. The facility passes in, for the client:
First Name
Last Name
Email
Phone Number
Payment Credential
Card #
Expiry Date
CW
Payment Method,
and the API returns customer ID.

Next, the facility calls a submit payment information API exposed by the payment gateways partner. The facility passes in, for the client:
Customer ID
Client Token
Payment Method
Payment Credential,
and the API returns a payment nonce.

Next, the facility calls a create payment transaction API exposed by the payment gateways partner. The facility passes in, for the client:
Customer ID
Payment Method
Payment Nonce,
and the API returns:
Success or Failure
Transaction ID.

In act 2419, the payment processing partner processes the payment, and sends the facility platform a payment confirmation on completion. In response, the facility platform calls an API exposed by the banking as a service partner to credit the portion of the payment that is to be directed to the freelancer (i.e., reduced by any transaction fee imposed by the facility) to be transferred from the facility's master account to the individual account of the freelancer.

In some embodiments, in act 2419, the facility calls a create a transfer API exposed by the banking and card processing partner. The facility passes in:
Source Account ID
Destination Account ID
Amount.
and the API returns Success or Failure.

The facility platform also notifies the facility app of the payment, which in act 2424 the app notifies the freelancer about, and adds it to the payment history and account tracking data maintained by the app for the account, and viewable by the freelancer using the account.

In some embodiments, in act 2424, the facility calls a push notification delivery API exposed by the messaging partner. The facility passes in the text of the notification, and the API returns Success or Failure.

When the payment processing partner settles the funds for the payment order in act 2425, it transfers these to the facility's master account, for settlement into the master account in act 2426. Additional information about the facility's performance of the interactions shown in FIG. 24 is discussed below in connection with FIG. 25.

Figure 25:
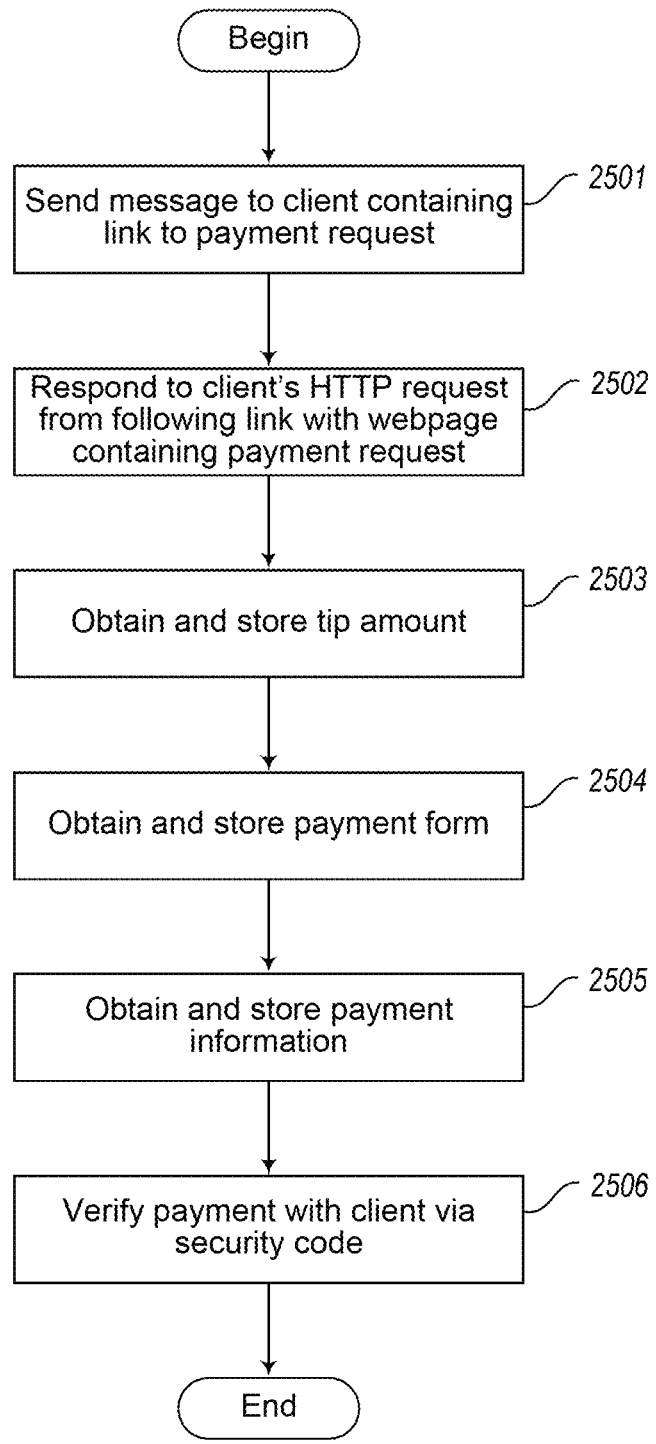
FIG. 25 is a flow diagram showing a process performed by the facility in some embodiments to interact with the client's device in connection with a payment request.

FIG. 25 is a flow diagram showing a process performed by the facility in some embodiments to interact with the client's device in connection with a payment request. In act 2501, the facility sends a message to the client containing a link to the payment request, such as an SMS or an email message. Additional information about the facility's performance of act 2501 is discussed below in connection with FIG. 26.

Figure 26:
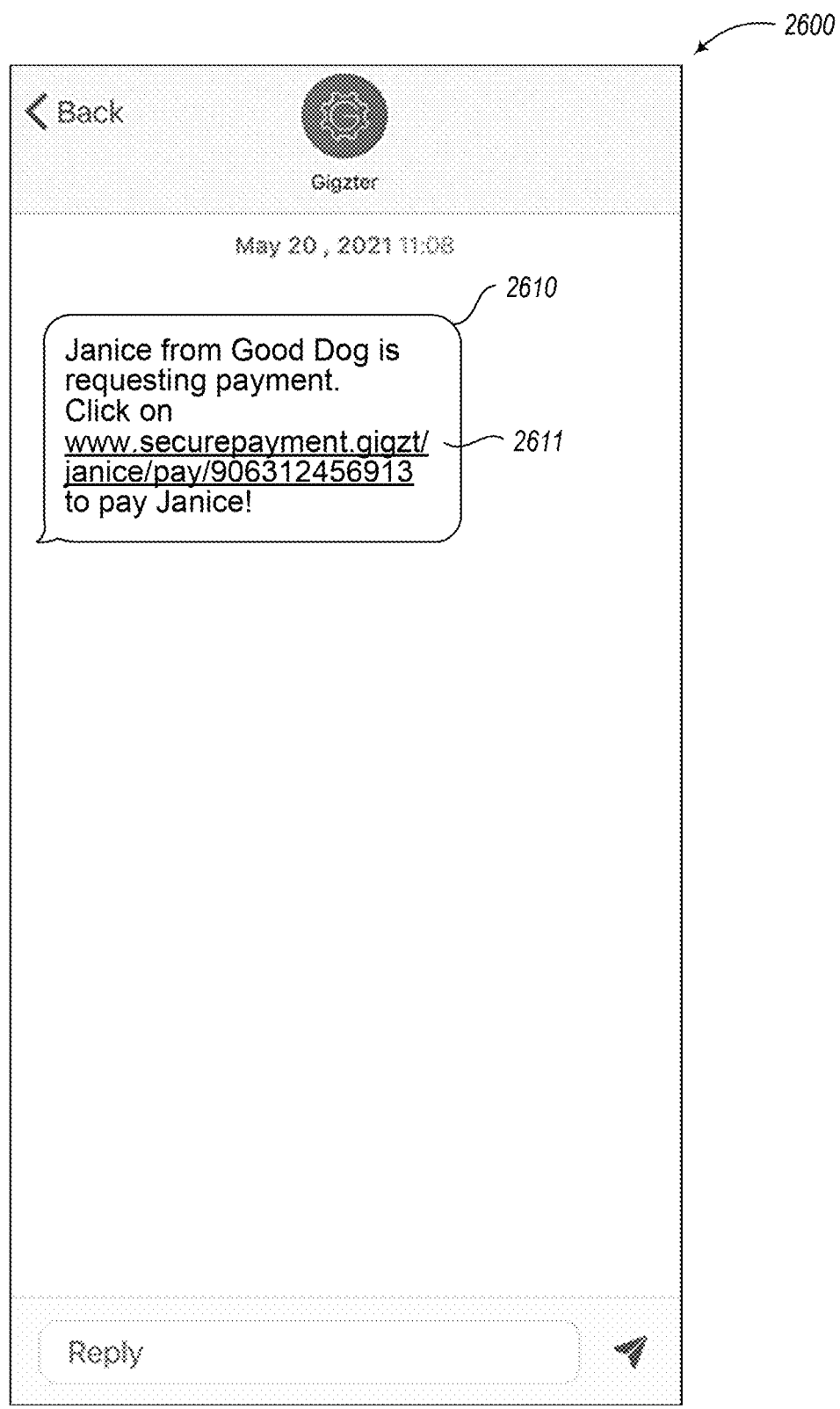
FIG. 26 is a display diagram showing a sample display presented by the facility in some embodiments containing a message sent to the client containing a link to the payment request.

FIG. 26 is a display diagram showing a sample display presented by the facility in some embodiments containing a message sent to the client containing a link to the payment request. The display 2600 shows an SMS message 2610 sent to the mobile device of the client, which identifies the freelancer and their company, and contains a link 2611 that the client can follow in order to perform the payment process.

Returning to FIG. 25, in act 2502, the facility responds to an HTTP request sent by the client when the client follows the link with a webpage containing the payment request. In act 2503, the facility obtains from the client a tip amount and stores it. The facility's performance of acts 2502 and 2503 is discussed further below in connection with FIG. 27.

Figure 27:
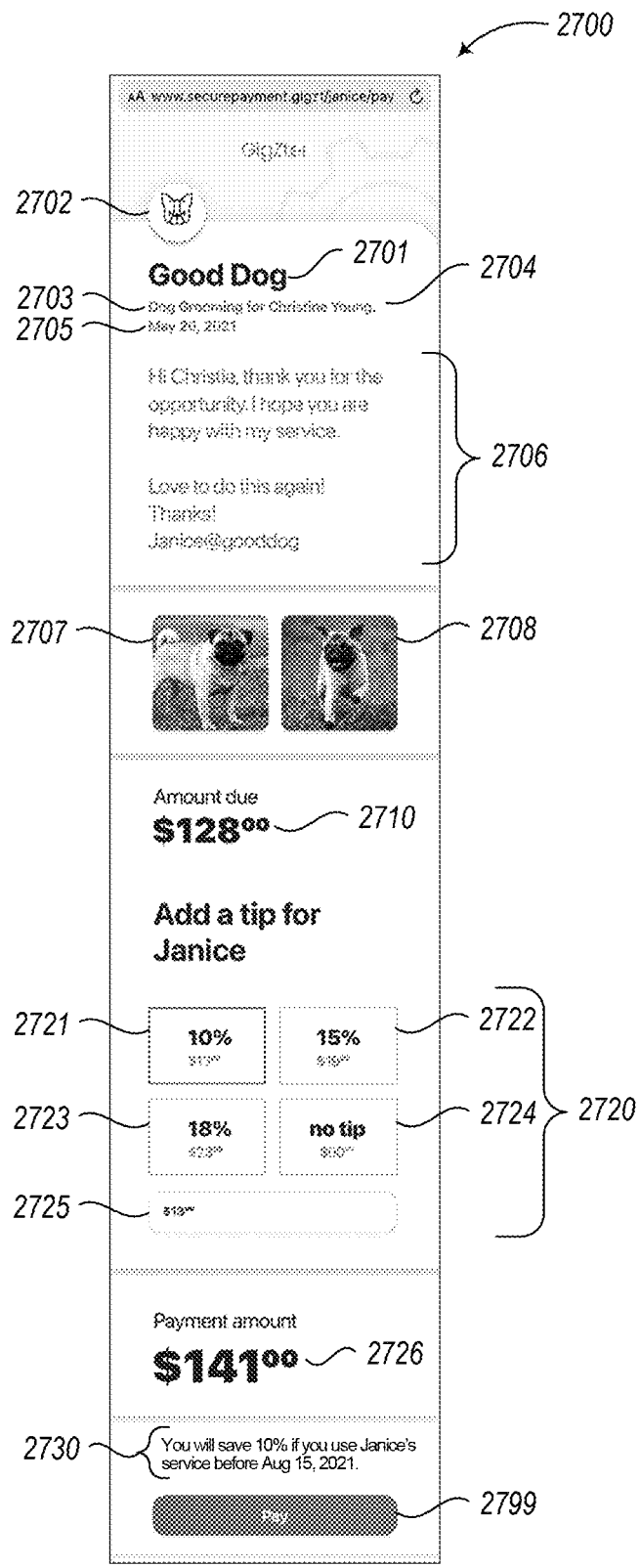
FIG. 27 is a display diagram showing a sample display presented by the facility in some embodiments to present the payment request to the client.

FIG. 27 is a display diagram showing a sample display presented by the facility in some embodiments to present the payment request to the client. In a manner similar to the payment request preview shown in FIG. 23, the display 2700 contains the freelancer's company name 2701 and company logo 2702; project name 2703, client name 2704, and project date 2705; textual message 2706; and completion photos 2707 and 2708. The payment request includes an amount due 2710—which, in this case, is the sum of the amount specified by the freelancer and the facility's processing fee—as well as a control 2720 that the client can use to specify a tip to include in the tip. In particular, the client can select any of rectangles 2721-2724 to specify a listed percentage of the total amount due, or type a custom tip amount in 2725. The display contains an indication 2726 of the total amount that the client will pay, obtained by summing the amount 2710 and the tip selected 2721. The payment request also includes special offer 2730, and a control 2799 that the client can activate in order to proceed.

Returning to FIG. 25, in act 2504, the facility obtains and stores a form of payment selected by the client. The facility's performance of act 2504 is discussed further below in connection with FIG. 28.

Figure 28:
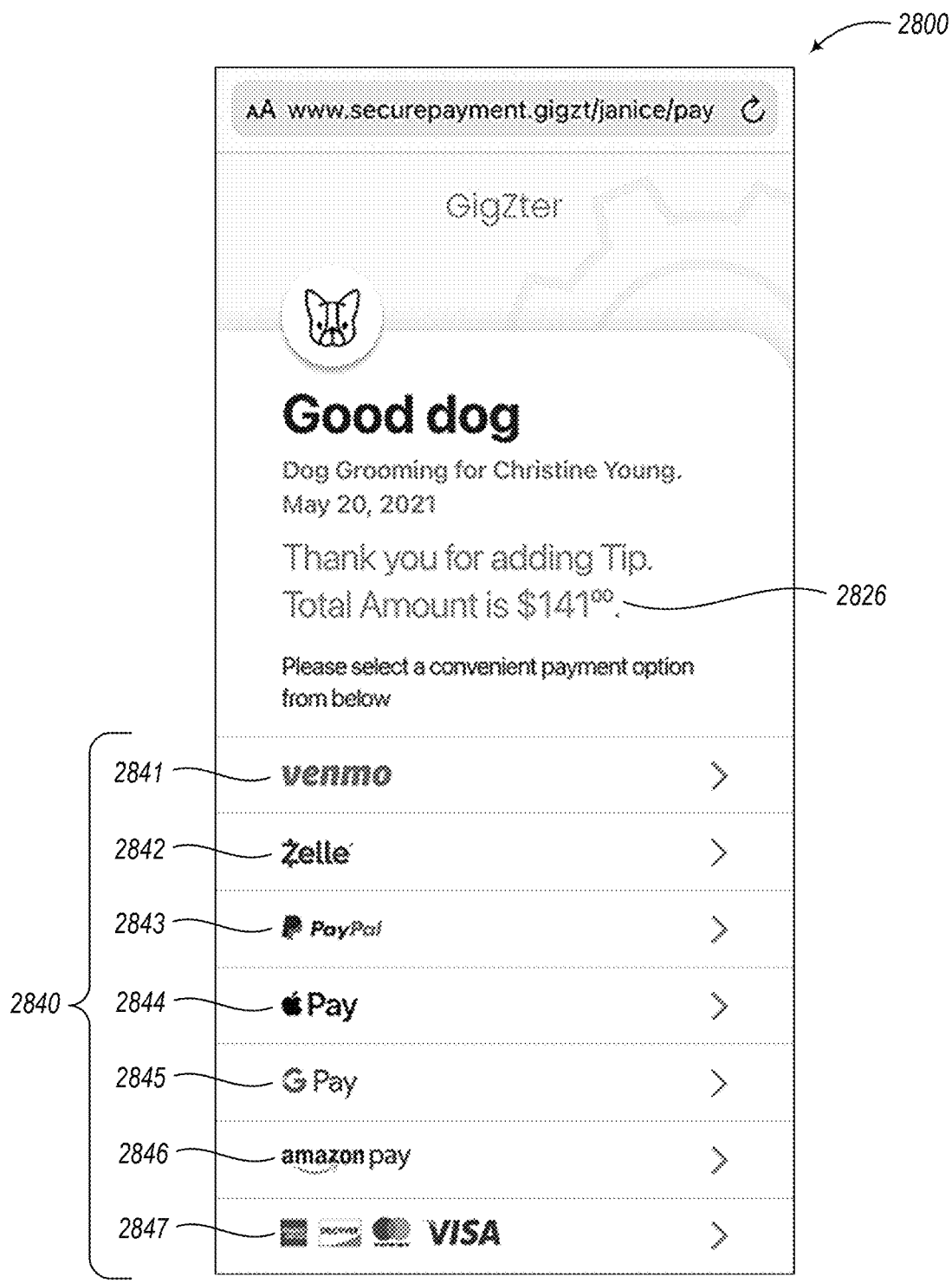
FIG. 28 is a display diagram showing a sample display presented by the facility in some embodiments to permit the client to select a payment method.

FIG. 28 is a display diagram showing a sample display presented by the facility in some embodiments to permit the client to select a payment method. The display 2700 includes an indication 2826 of the amount that will be paid, as well as a list 2840 of payment methods that can be selected by the client in order to effect the payment. For example, can tap the credit card/debit card payment method 2847, or the Apple Pay payment method 2844. The results of doing each are shown below in FIGS. 28 and 29.

Returning to FIG. 25, in act 2505, the facility obtains and stores payment credentials need to form a payment order for the payment method selected by the client in act 2504. The facility's performance of act 2505 is discussed in connection with FIGS. 28 and 29.

Figure 29:
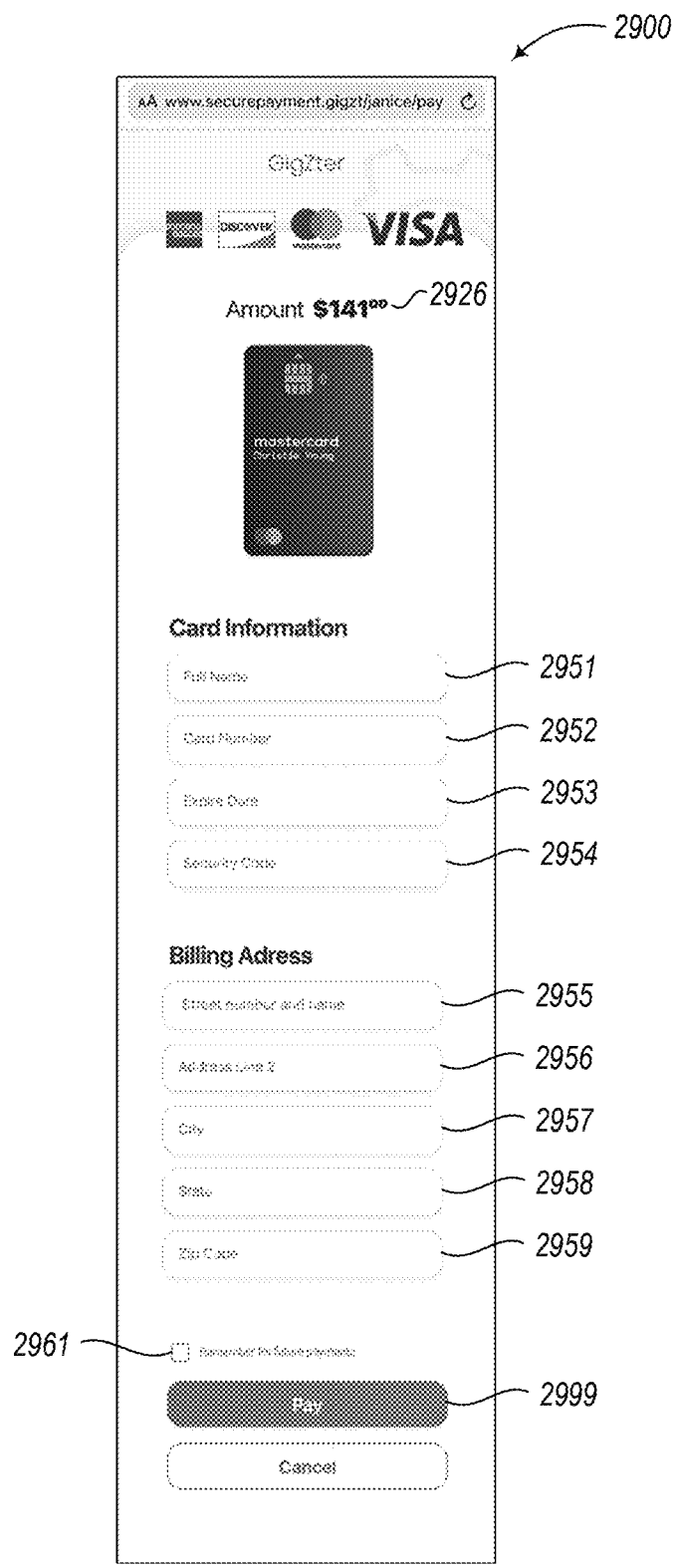
FIG. 29 is a display diagram showing a sample display presented by the facility to collect payment credentials needed to form a payment order for a first payment method.

FIG. 29 is a display diagram showing a sample display presented by the facility to collect payment credentials needed to form a payment order for a first payment method. In particular, display 2900 is designed to collect the payment credentials needed in order to form a proper payment instruction for the credit/debit card form of payment 2847 shown in FIG. 28. The display 2900 includes indication 2926 of the total amount to be paid; fields 2951-2954 for entering information about the credit or debit card; fields 2955-2959 for entering the billing address for the credit or debit card; a box 2961 that the client can check in order to remember this credit/debit card information for future payments; and a pay control 2999 that the client can activate in order to complete the payment.

Figure 30:
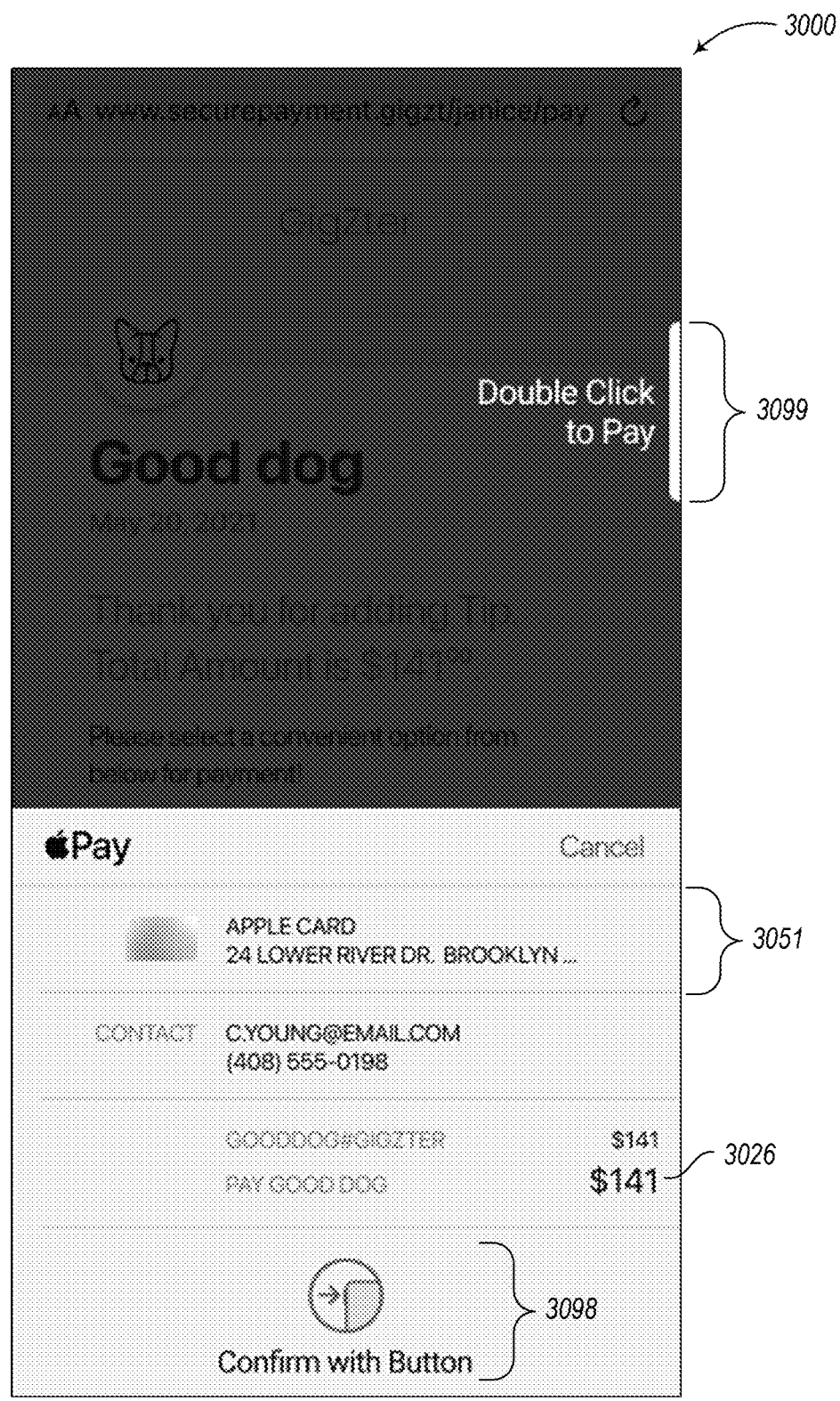
FIG. 30 is a display diagram showing a sample display presented by the facility in some embodiments to collect payment credentials needed for a second form of payment.

FIG. 30 is a display diagram showing a sample display presented by the facility in some embodiments to collect payment credentials needed for a second form of payment. In particular, the display 3000 is designed to collect information needed in order to complete a payment order using the apple pay form of payment 2844 shown in FIG. 28. The display includes information 3051 about an Apple credit card associated with this mobile device, as well as the total amount to be paid 3026. The display also includes instructions 3098 about interacting with a hardware switch of the mobile device in order to complete the payment, as well as a similar instructions 3099 identifying the location of the hardware switch and the particular interaction to be used with it to complete the payment.

Returning to FIG. 25, in act 2506, the facility verifies the payment with the client using a security code. The facility's performance of act 2506 is discussed further below in connection with FIG. 31. After act 2506, this process concludes.

Figure 31:
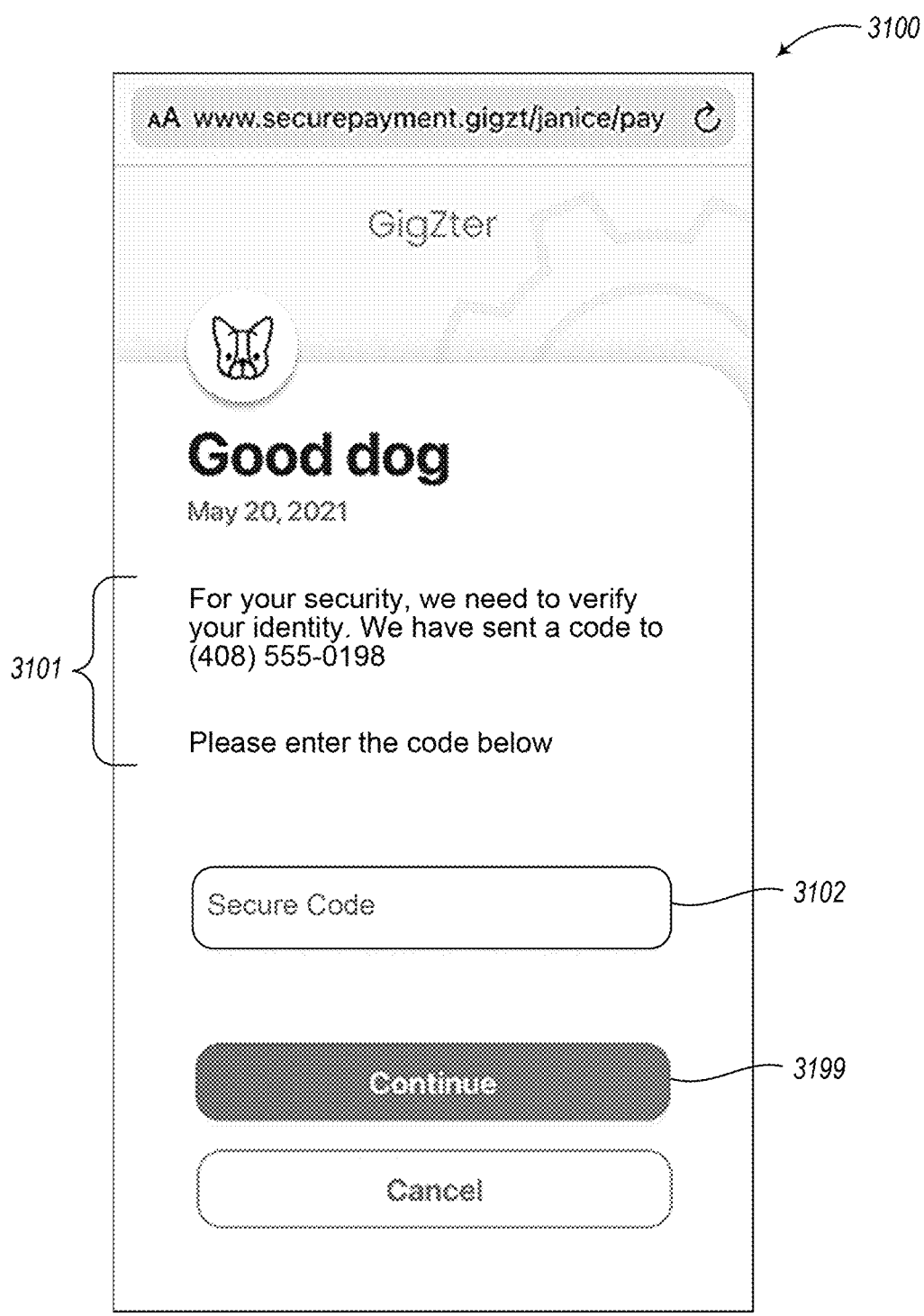
FIG. 31 is a display diagram showing a display presented by the facility in some embodiments in order to verify payment with the client.

FIG. 31 is a display diagram showing a display presented by the facility in some embodiments in order to verify payment with the client. In particular, the display 3100 includes a message 3101 describing an SMS message sent to the client; a field 3102 where the client is to enter the code contained by that SMS message; and a continue control 3199 that the client can activate in order to complete the process of verifying the payment.

Figure 32:
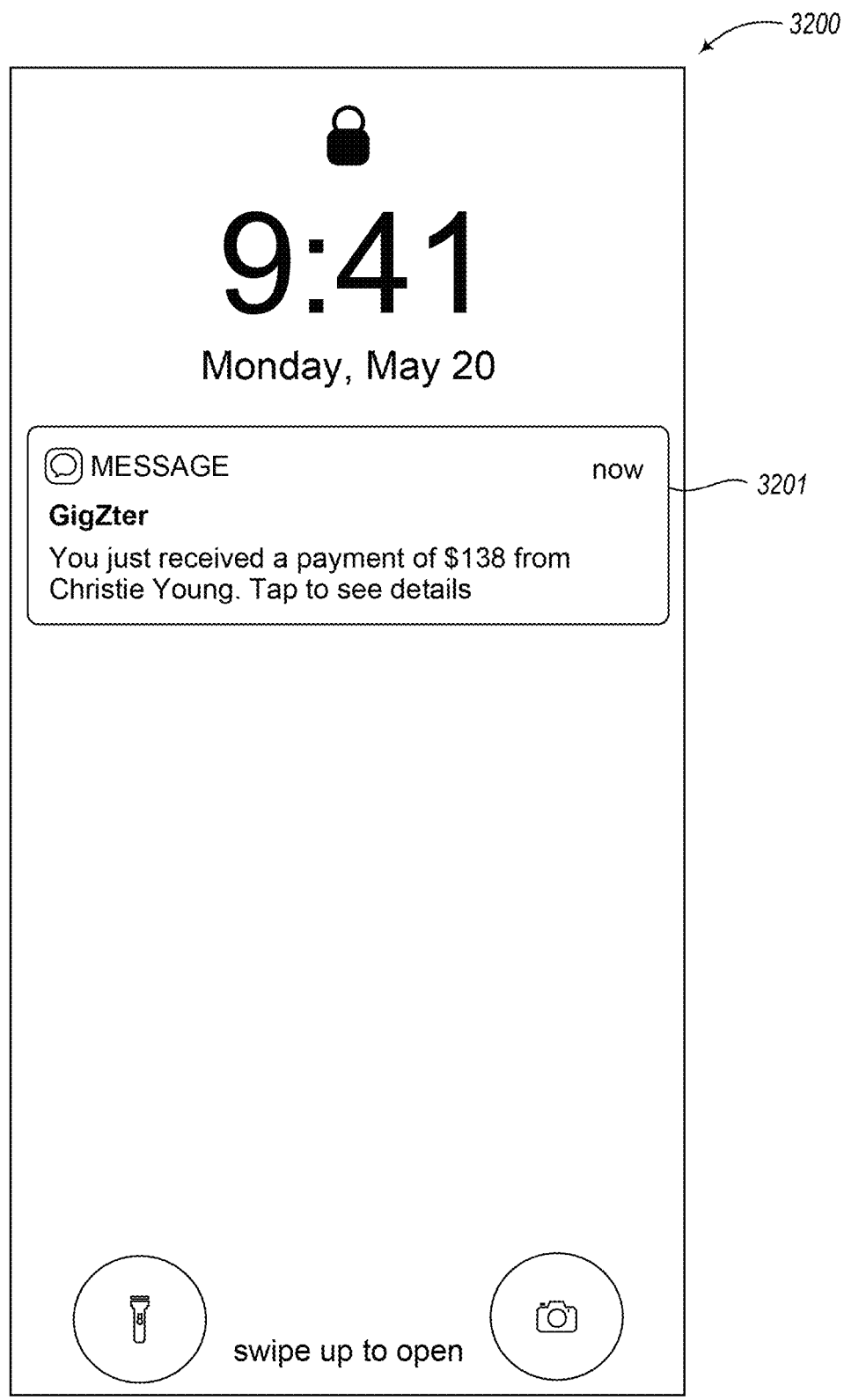
FIG. 32 display diagram showing a sample display presented by the facility in some embodiments in order to notify the freelancer of the client's payment.

FIG. 32 display diagram showing a sample display presented by the facility in some embodiments in order to notify the freelancer of the client's payment. The display 3200 includes a notification 3201 that identifies the client and the amount of the client's payment that has been directed to the account of the freelancer. In some embodiments, the user can touch the notification in order to open the app to display information about the received payment.

Returning to FIG. 3, after act 305, the facility continues in act 302 to again display the home screen.

Figure 33:
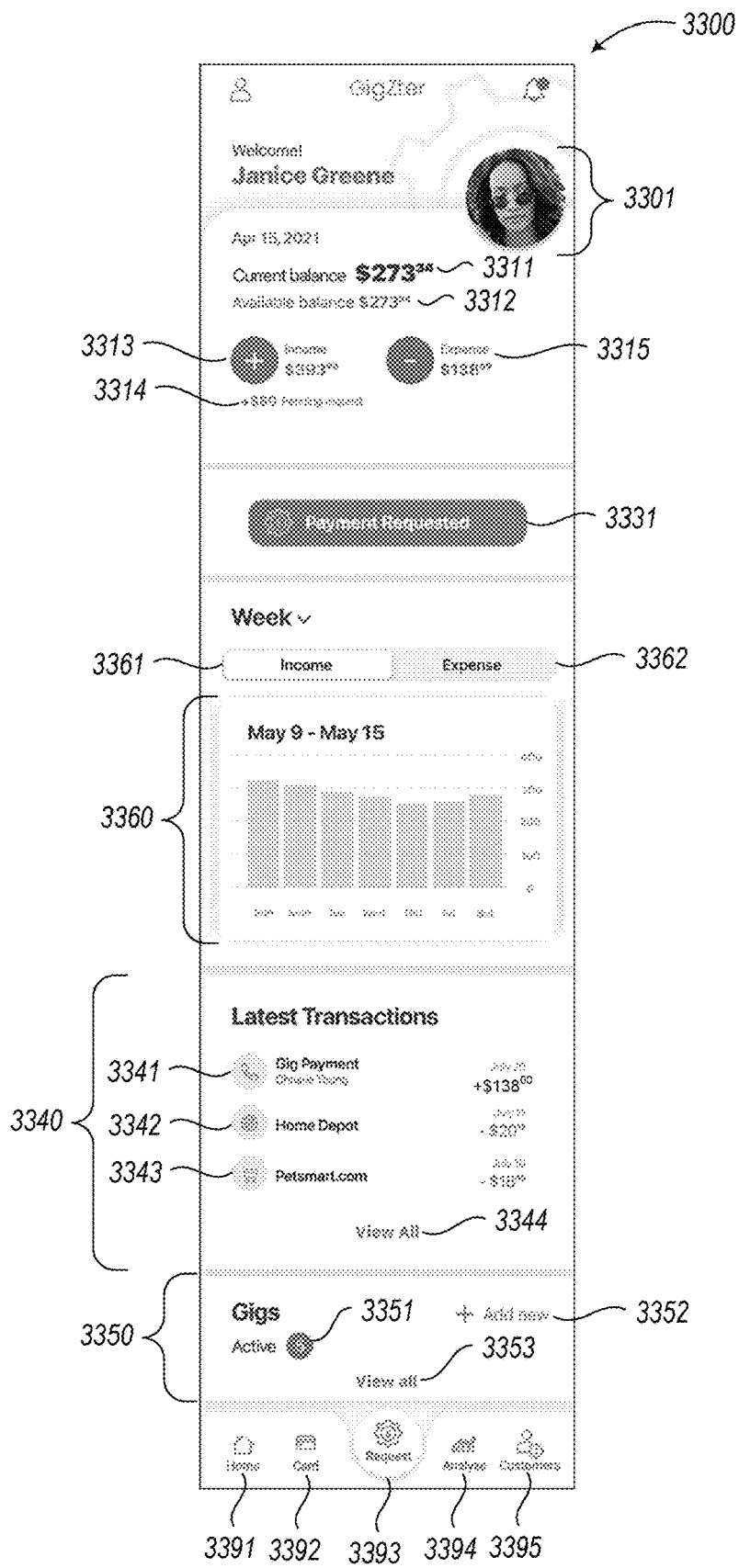
FIG. 33 is a display diagram showing a sample display presented by the facility containing the home screen in a later state.

FIG. 33 is a display diagram showing a sample display presented by the facility containing the home screen in a later state than shown in FIG. 9, which reflects the client payment made based on the client interactions in FIGS. 25-30. In particular, the list 3340 of latest transactions includes an indication 3341 of the payment for $138. This list of latest transactions also includes indications 3342 and 3343 of purchases recently made using the account. The freelancer can activate control 3344 to display the list of transactions for the account. Additionally, results section 3360 contains a bar graph 3363 showing the sum of payments made to the account on each day of the days between May 9th and May 15th. The freelancer can switch to a graph of daily expenses by activating control 3362. The display includes the selected photo 3301 of the freelancer. The display contains indications 3311 and 3312 that the current balance of the account is $273.34, and that this entire balance is available to spend or withdraw. The display shows an indication 3313 of total income of $393.99, and an indication 3315 of total expenses of $138.99. An indication 3314 shows $59 in payment requests that have been sent, but not yet paid. The display shows an indication 3351 of five active gigs, a list of which the freelancer can display by activating control 3353. The freelancer can also add a new gig by activating control 3352.

Returning to FIG. 3, in act 304, if the freelancer selects the card navigation control 3392, the facility continues in act 306. In act 306, the facility shows a variety of debit card and account details and actions. For example, these can include balances, account number, routing number, last four digits of the card number, controls for activating the card when new, suspending or resuming operation of the card, reporting the card is lost or stolen, etc. After act 306, the facility continues in act 302.

In some embodiments, as part of performing act 306, the facility calls one or more of the following APIs exposed by the banking and card processing partner:

A retrieve an account API; the facility passes in account ID, and the API returns:
    Account ID
    Account Number
    Account Type
    Account Name
    Status
    balance
    creation date
    routing number
    product id A list transactions API; the facility passes in:
    cardholder ID
    account ID,
and the API returns a list of transactions, each comprising:
    Transaction ID
        Transaction Date
        Status
        Amount
        Description A list transactions API; the facility passes in:
    cardholder ID
    account ID,
and the API returns a list of transactions, each comprising:
    Transaction ID
        Transaction Date
        Status An update card API; the facility passes in:
    card ID
    new card status code,
and the API returns Success or Failure in updating the card to the specified status, such as active, closed, lost, etc.

In act 303, if the freelancer selects the client or customers navigation control 3395, then the facility continues in act 307. In act 307, the facility shows client details and actions, where the freelancer can add or update customer details, see recent projects for each customer, initiate payment requests, or add new projects. After act 307, the facility continues in act 302.

In act 303, if the freelancer activates the analytics or analyze navigation control 3394, then the facility continues in act 308. In act 308, the facility shows representations of income, expenses, and account balances for the freelancer. After act 308, the facility continues in act 302.

In some embodiments, the facility performs certain natural language transformations on behalf of the freelancer and clients. This enables freelancers to work more effectively with clients whose primary natural language is different from their own.

In some embodiments, the facility provides a user interface for the freelancers to specify their own primary natural language, as well as a default natural language for their clients. For example, a freelancer who grew up in Mexico speaking primarily Spanish and has moved to a part of the United States where English is prevalent would specify Spanish as their primary natural language, and English as the default natural language of their clients. For clients who have a primary natural language that differs from the default client natural language, the freelancer can override the default client natural language for that client by specifying a primary natural language for that client different from the default client natural language.

In the app, the facility displays text to the freelancer in the freelancer's primary natural language, including, for example, instruction text, navigation text, field names, notification text, account information text, status text, etc. In some embodiments, app text elements are all specified by the app's developers in an original natural language, and are stored in a data resource—such as a column of an app text element table—in the original natural language. For each of a number of supported natural languages other than the original natural language, these app text elements are manually or automatically translated into corresponding app text elements in the supported natural language, and are added to a new column of the app text elements table for the supported natural language. The app generates its displays using the app text elements in the table from the column corresponding to the primary natural language the freelancer specifies for themself. The facility uses a similar approach for generating the payment request and other communications directed to the client, using the column of the text element table for the default client natural language, or an overridden natural language for a particular client.

Further, in some embodiments, the facility also dynamically translates among natural language text strings that are not shipped as part of the app but are entered by the freelancer or a client. In some embodiments, the facility calls an automatic translation service in order to translate such strings when needed. For example, in some embodiments, the facility translates the payment request message entered by the freelancer in their own primary natural langue into the primary natural language of each client in generating payment requests for that client. Project requests requesting performance of a particular project are or other communications conveyed by the facility from a client to the freelancer translated by the facility in the opposite direction. In some embodiments, preparation and/or preview of a communication in the app occurs in the preparer's primary language, and is sent in the addressee's primary language.

In various embodiments, the facility operates on behalf of self-employed individuals, sole proprietors, online businesses, small businesses, or various other similar people or entity types.

In some embodiments, the facility provides one or more instances of computer-readable media collectively having contents configured to cause a server computer system to perform a method, the method comprising:
    receiving identifying information for a user transmitted from a hand-held computing system;

making a call to a first function exposed by a bank, the call to the first function including at least a portion of the received identifying information and requesting that the bank create account for the user;

receiving electronic payment credentials submitted by a client with respect to a payment to be made by the client to the user;

making a call to a second function exposed by a payment processor, the call to the second function conveying the received electronic payment credentials and seeking a payment transaction using the received electronic payment credentials of a distinguished amount from the client to a master account;

receiving an indication that the call to the second function succeeded; and in response to receiving the indication that the call to the second function succeeded, making a call to a third function exposed by the bank, the call to the third function requesting to transfer an amount based on the distinguished amount from the master account to the account created for the user.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more instances of computer-readable media collectively having contents configured to cause a server computer system to perform a method with respect to (1) a client device used by a client, (2) a payment processor computer system, (3) a bank computer system, and (4) a hand-held computing system used by a user, each of which is distinct from the server computer system, the method comprising:

receiving information transmitted from the hand-held computing system identifying a payment request to make to the client;

using the received information to construct a request for electronic payment from the client to the user;

while constructing the request for electronic payment from the client to the user, obtaining photographic data captured in real-time by at least a camera of the hand-held computing system, the photographic data indicating completion of a task performed for the payment request;

incorporating the obtained photographic data into the request for electronic payment;

making a call to a messaging API function exposed by a message delivery service, the call to the messaging API function including the constructed request and requesting that the constructed request be electronically delivered to the client;

responsive to making the call to the messaging API function, receiving electronic payment credentials submitted by the client device with respect to the payment to be made by the client to the user;

making a call to a first API function exposed by the payment processor computer system, which is distinct from the bank computer system, the call to the first API function conveying the received electronic payment credentials and seeking a payment transaction using the received electronic payment credentials of a distinguished amount from the client to a master account;

receiving an indication from the payment processor computer system that the call to the first API function succeeded in completing submission of the payment transaction using the received electronic payment credentials of a distinguished amount from the client to a master account, reflecting satisfaction by the submitted payment transaction of conditions needed for the payment transaction to succeed;

in response to receiving the indication that the call to the first API function succeeded, making a call to a second API function exposed by the bank computer system, the call to the second API function requesting to transfer an amount based on the distinguished amount from the master account to an account created for the user; and receiving an indication that the payment transaction has settled to the master account, and wherein the call to the second API function causes the transfer to the account created for the user to complete before the payment transaction is settled to the master account.

2. The one or more instances of computer-readable media of claim 1, the method further comprising:

receiving identifying information of the user transmitted from the hand-held computing system; and making a call to a third API function exposed by a bank, the call to the third API function including at least a portion of the received identifying information and requesting that the bank create account for the user.

3. The one or more instances of computer-readable media of claim 2, further comprising:

receiving mailing information for the user transmitted from the hand-held computing system;

making a call to a fourth API function exposed by the bank, the call to the fourth API function including at least a portion of the received mailing information and requesting that the bank issue a debit card for the created account to the user.

4. The one or more instances of computer-readable media of claim 1 wherein the amount of the requested transfer equals the distinguished amount.

5. The one or more instances of computer-readable media of claim 1 wherein the amount of the requested transfer is smaller than the distinguished amount.

6. The one or more instances of computer-readable media of claim 1, the method further comprising:

before making a call to the first API function, making a call to a third API function exposed by an accountholder verification service, the call to the third API function including the at least a portion of the received identifying information and requesting verification of the user's eligibility to be an accountholder.

7. The one or more instances of computer readable media of claim 1 wherein the call to the first API function is made in response to a user interface interaction by the client authorizing payment of the distinguished amount to the user, the method further comprising:

receiving an indication that the call to the second API function succeeded; and directly in response to receiving the indication that the call to the second API function succeeded, displaying to the user a balance in the account created for the user that reflects the transferred amount.

8. A method in a server computer system with respect to (1) a client device used by a client, (2) a payment processor computer system, (3) a bank computer system, each of which is distinct from the server computer system, and (4) a hand-held computing system used by a user, the method comprising:

receiving information transmitted from the hand-held computing system identifying a payment request to make to the client;

using the received information to construct a request for electronic payment from the client to the user;

while constructing the request for electronic payment from the client to the user, obtaining photographic data captured in real-time by at least a camera of the hand-held computing system, the photographic data indicating completion of a task performed for the payment request;

incorporating the obtained photographic data into the request for electronic payment;

making a call to a messaging API function exposed by a message delivery service, the call to the messaging API function including the constructed request and requesting that the constructed request be electronically delivered to the client;

responsive to making the call to the messaging API function, receiving electronic payment credentials submitted by the client device with respect to the payment to be made by the client to the user;

making a call to a first API function exposed by the payment processor computer system, which is distinct from the bank computer system, the call to the first API function conveying the received electronic payment credentials and seeking a payment transaction using the received electronic payment credentials of a distinguished amount from the client to a master account;

receiving an indication from the payment processor computer system that the call to the first API function succeeded in completing submission of the payment transaction using the received electronic payment credentials of a distinguished amount from the client to a master account, reflecting satisfaction by the submitted payment transaction of conditions needed for the payment transaction to succeed;

in response to receiving the indication that the call to the first API function succeeded, making a call to a second API function exposed by the bank computer system, the call to the second API function requesting to transfer an amount based on the distinguished amount from the master account to an account created for the user; and receiving an indication that the payment transaction has settled to the master account, and wherein the call to the second API function causes the transfer to the account created for the user to complete before the payment transaction is settled to the master account.

9. The method of claim 8, further comprising:

receiving identifying information of the user transmitted from the hand-held computing system; and making a call to a third API function exposed by a bank, the call to the third API function including at least a portion of the received identifying information and requesting that the bank create account for the user.

10. The method of claim 9, further comprising:

receiving mailing information for the user transmitted from the hand-held computing system;

making a call to a fourth API function exposed by the bank, the call to the fourth API function including at least a portion of the received mailing information and requesting that the bank issue a debit card for the created account to the user.

11. The method of claim 8 wherein the amount of the requested transfer equals the distinguished amount.

12. The method of claim 8 wherein the amount of the requested transfer is smaller than the distinguished amount.

13. The method of claim 8, further comprising:

before making a call to the first API function, making a call to a third API function exposed by an accountholder verification service, the call to the third API function including the at least a portion of the received identifying information and requesting verification of the user's eligibility to be an accountholder.

14. The method of claim 8 wherein the call to the first API function is made in response to a user interface interaction by the client authorizing payment of the distinguished amount to the user, the method further comprising:

receiving an indication that the call to the second API function succeeded; and directly in response to receiving the indication that the call to the second API function succeeded, displaying to the user a balance in the account created for the user that reflects the transferred amount.

15. A server computer system, comprising:

at least one processor; and memory having contents configured to cause the at least one processor to perform a method with respect to (1) a client device used by a client, (2) a payment processor computer system, (3) a bank computer system, and (4) a hand-held computing system used by a user, each of which is distinct from the server computer system, the method comprising:

receiving information transmitted from the hand-held computing system identifying a payment request to make to the client;

using the received information to construct a request for electronic payment from the client to the user;

while constructing the request for electronic payment from the client to the user, obtaining photographic data captured in real-time by at least a camera of the hand-held computing system, the photographic data indicating completion of a task performed for the payment request;

incorporating the obtained photographic data into the request for electronic payment;

making a call to a messaging API function exposed by a message delivery service, the call to the messaging API function including the constructed request and requesting that the constructed request be electronically delivered to the client;

responsive to making the call to the messaging API function, receiving electronic payment credentials submitted by the client device with respect to the payment to be made by the client to the user;

making a call to a first API function exposed by the payment processor computer system, which is distinct from the bank computer system, the call to the first API function conveying the received electronic payment credentials and seeking a payment transaction using the received electronic payment credentials of a distinguished amount from the client to a master account;

receiving an indication from the payment processor computer system that the call to the first API function succeeded in completing submission of the payment transaction using the received electronic payment credentials of a distinguished amount from the client to a master account, reflecting satisfaction by the submitted payment transaction of conditions needed for the payment transaction to succeed;

in response to receiving the indication that the call to the first API function succeeded, making a call to a second API function exposed by the bank computer system, the call to the second API function requesting to transfer an amount based on the distinguished amount from the master account to an account created for the user; and receiving an indication that the payment transaction has settled to the master account, and wherein the call to the second API function causes the transfer to the account created for the user to complete before the payment transaction is settled to the master account.

16. The server computer system of claim 15, the method further comprising:

receiving identifying information of the user transmitted from the hand-held computing system; and making a call to a third API function exposed by a bank, the call to the third API function including at least a portion of the received identifying information and requesting that the bank create account for the user.

17. The server computer system of claim 16, the method further comprising:

receiving mailing information for the user transmitted from the hand-held computing system;

making a call to a fourth API function exposed by the bank, the call to the fourth API function including at least a portion of the received mailing information and requesting that the bank issue a debit card for the created account to the user.

18. The server computer system of claim 15 wherein the amount of the requested transfer equals the distinguished amount.

19. The server computer system of claim 15 wherein the amount of the requested transfer is smaller than the distinguished amount.

20. The server computer system of claim 15, the method further comprising:

before making a call to the first API function, making a call to a third API function exposed by an accountholder verification service, the call to the third API function including the at least a portion of the received identifying information and requesting verification of the user's eligibility to be an accountholder.

21. The server computer system of claim 15 wherein the call to the first API function is made in response to a user interface interaction by the client authorizing payment of the distinguished amount to the user, the method further comprising:

receiving an indication that the call to the second API function succeeded; and directly in response to receiving the indication that the call to the second API function succeeded, displaying to the user a balance in the account created for the user that reflects the transferred amount.

* * * * *